(12) United States Patent
Hu et al.

(10) Patent No.: US 11,601,657 B2
(45) Date of Patent: Mar. 7, 2023

(54) LUMA MAPPING WITH CHROMA SCALING (LMCS) IN VIDEO CODING

(71) Applicant: QUALCOMM Incorporated, San Diego, CA (US)

(72) Inventors: Nan Hu, San Diego, CA (US); Vadim Seregin, San Diego, CA (US); Muhammed Zeyd Coban, Carlsbad, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/218,898

(22) Filed: Mar. 31, 2021

(65) Prior Publication Data

US 2021/0314579 A1 Oct. 7, 2021

Related U.S. Application Data

(60) Provisional application No. 63/004,397, filed on Apr. 2, 2020.

(51) Int. Cl.
*H04N 19/186* (2014.01)
*H04N 19/70* (2014.01)
*H04N 19/103* (2014.01)
*H04N 19/82* (2014.01)
*H04N 19/50* (2014.01)
*H04N 19/176* (2014.01)

(52) U.S. Cl.
CPC ......... *H04N 19/186* (2014.11); *H04N 19/103* (2014.11); *H04N 19/176* (2014.11); *H04N 19/50* (2014.11); *H04N 19/70* (2014.11); *H04N 19/82* (2014.11)

(58) Field of Classification Search
CPC ............... H04N 19/186; H04N 19/103; H04N 19/176; H04N 19/50; H04N 19/70; H04N 19/82
USPC ...................................................... 375/240.12
See application file for complete search history.

(56) References Cited

U.S. PATENT DOCUMENTS

| 2020/0288173 | A1* | 9/2020 | Ye | H04N 19/186 |
| 2020/0404278 | A1* | 12/2020 | Ye | H04N 19/70 |
| 2021/0195247 | A1* | 6/2021 | Li | H04N 19/70 |
| 2021/0211700 | A1* | 7/2021 | Li | H04N 19/82 |

(Continued)

OTHER PUBLICATIONS

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-VE, 515 Pages.

(Continued)

*Primary Examiner* — Albert Kir
(74) *Attorney, Agent, or Firm* — Shumaker & Sieffert, P.A.

(57) ABSTRACT

A method of coding video data includes determining that chroma related syntax elements of the video data are present for luma mapping with chroma scaling (LMCS) for a coding unit (CU) of the video data, coding a syntax element of the video data when the chroma related syntax elements are present for LMCS for the CU, the syntax element is indicative of a value for determining a scaling parameter for chroma scaling in LMCS, and coding a chroma block of the CU based on the scaling parameter for chroma scaling.

28 Claims, 5 Drawing Sheets

(56) References Cited

U.S. PATENT DOCUMENTS

2021/0211738 A1* 7/2021 Yin ............... H04N 19/119
2021/0368210 A1* 11/2021 Sarwer ............ H04N 19/82

OTHER PUBLICATIONS

Deng Z., et al., "AHG9: Removal of APS Semantics Dependencies on SPS", JVET-R0074-v3, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-6.
Hu (Qualcomm) N., et al., "AHG9: APS, LMCS, Deblocking and PPS Constraints", 130th MPEG Meeting, Apr. 15-Apr. 24, 2020, Alpbach, (Motion Picture Expert Group and Joint Video Experts Team (JVET) of ITU-T SG 16 WP 3 and ISO/IEC JTC 1/SC 29/WG 11), No. m53209, JVET-R0232, Apr. 3, 2020 (Apr. 3, 2020), XP030286235, pp. 1-7, Retrieved from the Internet: URL:http://phenix.int-evry.fr/mpeg/doc_end_user/documents/130 Alpbach/wg11/m53209-JVET-R0232-v2-JVET-R0232.zip JVET-R0232-v1.docx [retrieved on Apr. 3, 2020] abstract sections 3 and 5.
International Search Report and Written Opinion—PCT/US2021/025425—ISA/EPO—dated Jun. 30, 2021 (11 pp).
ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.
Naser K., et al., "AHG 9: Combination of JVET-R0177/R0301 and JVET-R0074/R0232 on APS Signaling and Semantics Cleanup", JVET-R0433-r2, Joint Video Experts Team (JVET) of ITU-T SG 16 WP 3 and ISO/IEC JTC 1/SC 29/WG 11, 18th Meeting: by Teleconference, Apr. 15-24, 2020, pp. 1-6.

* cited by examiner

LUMA MAPPING WITH CHROMA SCALING (LMCS) IN VIDEO CODING

This application claims priority to U.S. Provisional Application No. 63/004,397, filed Apr. 2, 2020, the entire contents of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for luma mapping with chroma scaling (LMCS). As described in more detail, this disclosure describes example techniques to minimize the amount of information that a video encoder signals and that a video decoder receives for performing LMCS. This disclosure also describes examples for constraints that may be applied to minimize decoding errors by a video decoder. In this way, the example techniques improve the overall operation of video encoders and video decoders, and provide for practical applications in video coding technologies.

In one example, this disclosure describes a method of coding video data, the method comprising determining that chroma related syntax elements of the video data are present for luma mapping with chroma scaling (LMCS) for a coding unit (CU) of the video data, coding a syntax element of the video data when the chroma related syntax elements are present for LMCS for the CU, the syntax element is indicative of a value for determining a scaling parameter for chroma scaling in LMCS, and coding a chroma block of the CU based on the scaling parameter for chroma scaling.

In one example, the disclosure describes a device for coding video data, the device comprising memory configured to store the video data and processing circuitry configured to determine that chroma related syntax elements of the video data are present for luma mapping with chroma scaling (LMCS) for a coding unit (CU) of the video data, code a syntax element of the video data when the chroma related syntax elements are present for LMCS for the CU, the syntax element is indicative of a value for determining a scaling parameter for chroma scaling in LMCS, and code a chroma block of the CU based on the scaling parameter for chroma scaling.

In one example, the disclosure describes a computer-readable storage medium storing instructions thereon that when executed cause one or more processors to determine that chroma related syntax elements of the video data are present for luma mapping with chroma scaling (LMCS) for a coding unit (CU) of the video data, code a syntax element of the video data when the chroma related syntax elements are present for LMCS for the CU, the syntax element is indicative of a value for determining a scaling parameter for chroma scaling in LMCS, and code a chroma block of the CU based on the scaling parameter for chroma scaling.

In one example, the disclosure describes a device for coding video data, the device comprising means for determining that chroma related syntax elements of the video data are present for luma mapping with chroma scaling (LMCS) for a coding unit (CU) of the video data, means for coding a syntax element of the video data when the chroma related syntax elements are present for LMCS for the CU, the syntax element is indicative of a value for determining a scaling parameter for chroma scaling in LMCS, and means for coding a chroma block of the CU based on the scaling parameter for chroma scaling.

The details of one or more examples are set forth in the accompanying drawings and the description below. Other features, objects, and advantages will be apparent from the description, drawings, and claims.

DETAILED DESCRIPTION

Figure 1:
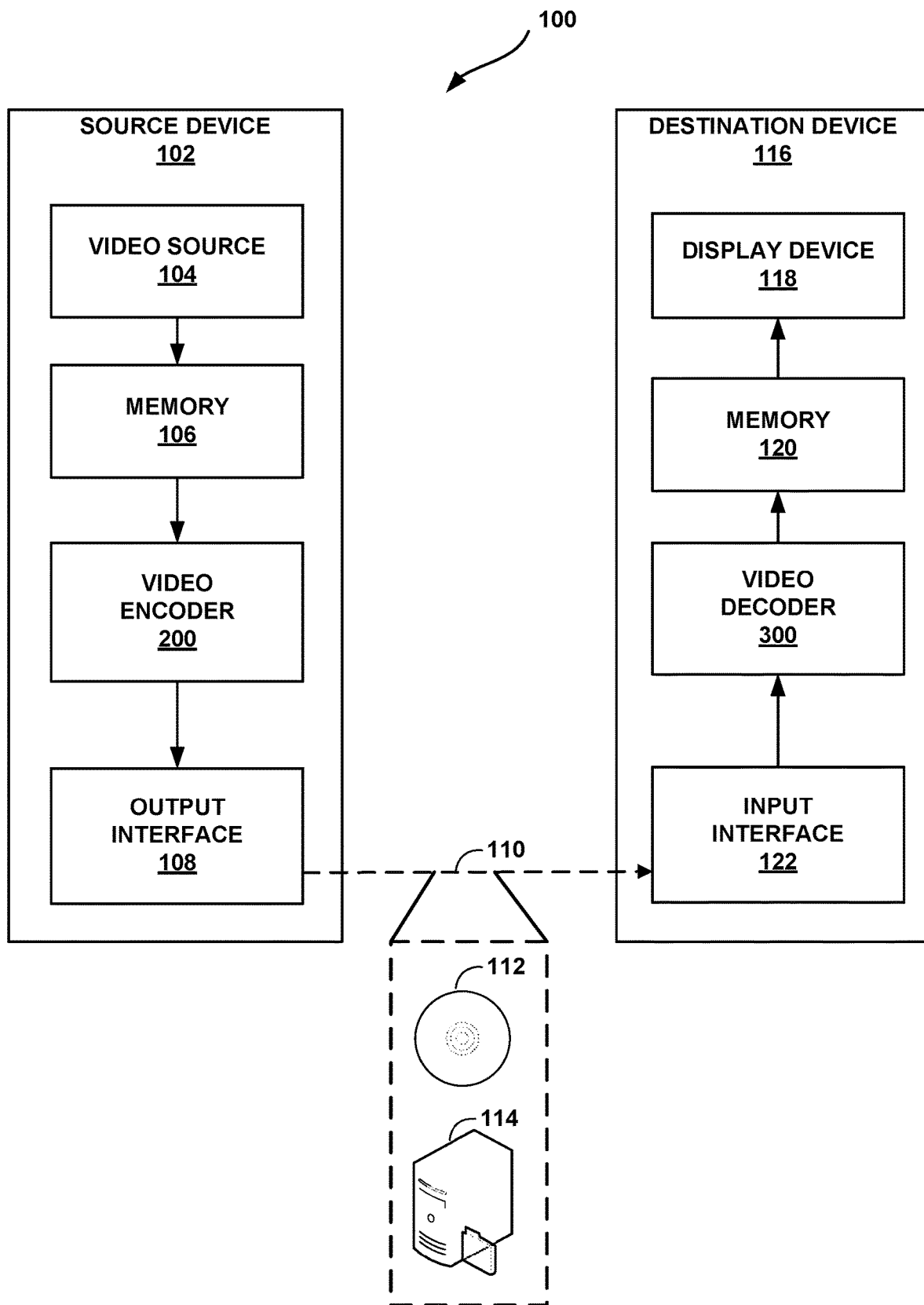
FIG. 1 is a block diagram illustrating an example video encoding and decoding system that may perform the techniques of this disclosure.

In video coding techniques, a video encoder generates a prediction block for a current block (e.g., a coding unit (CU)). The prediction block may be based on samples that are in the same picture as the current block (e.g., for intra-prediction or intra block-copy (IBC) prediction), or may be based on samples that are in the different picture (e.g., for inter-prediction). The video encoder determines a residual (e.g., difference) between the current block and the prediction block, and signals information indicative of the residual (e.g., after transform and quantization), which tends to require fewer bits than signaling the values of the samples of the current block.

A video decoder receives the information indicative of the residual, and generates a prediction block in the same way as the video encoder. The video decoder then adds the residual to the prediction block to reconstruct the current block.

Luma mapping with chroma scaling (LMCS) is an example video coding tool that may be used with the various prediction techniques. A current block (e.g., coding unit (CU)) includes a luma block with luma samples, and two chroma blocks with chroma samples (e.g., Cb and Cr blocks).

In LMCS, a video encoder maps luma samples of a luma block to generate mapped luma samples of a mapped luma block. The video encoder determines residual (e.g., difference) between the mapped luma block and a mapped luma prediction block (e.g., a luma prediction block that has been mapped similar to the luma block) to generate a mapped luma residual block. The video encoder performs transform and quantization on the mapped luma residual block, and signals the resulting residual values.

For mapping of luma samples, the video encoder may implement a mapping function. In the mapping function, there may be a plurality of separation points, and one separation point may be connected with another separation point with a segment. There may be 16 segments, and the slope of the segments may be different. A video encoder may determine to which segment a luma sample belongs, and then map the luma sample to generate a mapped luma sample based on the slope of the segment to which the luma sample belongs.

For chroma, the video encoder determines a residual (e.g., a difference) between samples of a chroma block and samples of a chroma prediction block. The video encoder then scales the result to generate a scaled chroma residual block. The video encoder performs transform and quantization on the scaled chroma residual block, and signals the resulting residual values. In one or more examples, the video encoder may determine a scaling parameter (e.g., coefficient indicating the amount of scaling that the video encoder applies to the residual chroma block) based on the mapped luma reconstructed block. For ease, the examples are described with respect to a chroma block, which may be either a Cb chroma block or Cr chroma block, and the example techniques applied to one of the chroma blocks may be applied to the other chroma block as well.

A video decoder may receive signaling from the video encoder of the residual blocks, and may perform inverse quantization and inverse transform to generate the mapped luma residual block. The video decoder may also generate a mapped luma prediction block in the same way that the video encoder generated the mapped luma prediction block. The video decoder may add the mapped luma prediction block and the mapped luma residual block to generate the mapped luma block. The video decoder may perform inverse mapping to reconstruct the luma block. For instance, the video decoder may perform the inverse operations that the video encoder performed for mapping.

For chroma, the video decoder may receive signaling from the video encoder of the residual blocks, and may perform inverse quantization and inverse transform to generate the scaled chroma residual block. The video decoder may determine a scaling parameter (e.g., coefficient indicating the amount of scaling that the video decoder applies to the scaled chroma block) based on the mapped luma reconstructed block and values signaled by the video encoder. The scaling parameter that the video decoder determines may be the inverse of the scaling parameter that the video encoder determines. The video decoder may perform inverse scaling on the scaled chroma residual block based on the scaling parameter to generate the chroma residual block. The video decoder may generate a chroma prediction block, similar to the video encoder, and add the chroma prediction block to the chroma residual block to reconstruct the chroma block.

The video decoder may repeat such operations for both chroma blocks. In this way, with LMCS, the video decoder may reconstruct the luma block and the two chroma blocks. The luma block and the two chroma blocks may together form the CU.

There may be some issues with LMCS techniques. As one example, there may be certain video formats in which there are no chroma samples. For instance, for monochrome color format, there may be not chroma samples. However, in some LMCS techniques, a video encoder may still signal values used to determine the scaling parameter even in cases where there are no chroma samples.

This disclosure describes example techniques to selectively signal and parse syntax elements to determine scaling parameter when chroma related syntax elements (e.g., when chroma samples) are present, and bypass (e.g., avoid) signaling and parsing syntax elements to determine scaling parameter when chroma related syntax elements (e.g., when chroma samples) are not present (e.g., such as in monochrome color format). That is, the bitstream may include chroma related syntax elements (e.g., such as when chroma samples are present), and in such examples the bitstream may also include syntax elements to determine scaling parameters. However, if the bitstream does not include chroma related syntax elements (e.g., such as when chroma samples are not present), the bitstream may not include syntax elements to determine scaling parameter.

This disclosure also describes examples of constraints that may be applied in signaling syntax elements for LMCS. In some examples, certain constraints may also be included for other video coding tools, such as adaptive loop filtering (ALF). In this way, the example techniques may promote bandwidth efficiency by selectively signaling and parsing syntax elements for LMCS based on whether chroma related syntax elements (e.g., chroma samples) are present or not. Moreover, the example techniques may promote accurate reconstruction of blocks based on the constraints that improves the coding operations.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for high-level syntax signaling in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for high-level syntax signaling in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, $17^{th}$ Meeting: Brussels, BE, 7-17 Jan. 2020, JVET-Q2001-vE (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

There may be certain issues with signaling in VVC Draft 8. For example, for APS type, in VVC Draft 8, some tools are used with an adaptation parameter set (APS) such as an adaptive loop filter (ALF). When these tools are disabled, for example in the sequence parameter set (SPS), the corresponding APS type can still be present in a bitstream. However, having the corresponding APS type in the bitstream is redundant.

As another example, for a CCALF filter in ALF_APS, in VVC Draft 8, cross component adaptive loop filter (CCALF) coefficients are signaled in ALF_APSs. However, when CCALF is disabled, CCALF filter coefficients can still be present in a bit stream. Having CCALF filter coefficients in the bitstream when CCALF is disabled may not be necessary and may impact bandwidth efficiency with unnecessary signaling.

As another example, for chroma deblocking filter parameter signaling for monochrome, in VVC Draft 8, chroma deblocking filter parameters are signaled for all chroma formats. However, these parameters may be redundant (e.g., unnecessary) for monochrome content.

As another example, for LMCS chroma scaling parameters signaling in LMCS_APS, in VVC Draft 8, LMCS chroma scaling parameters are signaled for all chroma formats. However, these parameters may be redundant (e.g., unnecessary) for monochrome content.

As another example, for dependency between PPS (picture parameter set), APS (adaptation parameter set) and PPS, in VVC Draft 8, there are constraints on syntax elements in APS and PPS depending on SPS (sequence parameter set), such as chroma format and bit depth in SPS. However, when parsing APS and PPS, SPS may be unavailable, so chroma format and bit depth are unavailable. In such cases, there may be issues in ensuring that the APS and PPS are compliant with constraint on the APS and PPS.

In accordance with the techniques of this disclosure, video encoder 200 and video decoder 300 may be configured to address one or more of the issues described above. The example techniques should not be construed as being limited to solving the issues described above. The example techniques may be used alone or in any combination.

In some examples, video decoder 300 may be configured to bypass parsing of information indicative of an adaptation parameter set (APS) type for adaptive loop filtering (ALF) for one or more blocks based on ALF being disabled for the one or more blocks and reconstruct the one or more blocks.

In some examples, video decoder 300 may be configured to bypass parsing of information indicative of cross component adaptive loop filter (CCALF) for one or more blocks based on CCALF being disabled for the one or more blocks and reconstruct the one or more blocks.

In some examples, video decoder 300 may be configured to determine whether to parse a syntax element indicative of whether chroma filters are signaled based on a chroma array type for a block and reconstruct the block.

In some examples, video decoder 300 may be configured to determine whether to parse information indicative of luma mapping and chroma scaling (LMCS) based on chroma array type and perform LMCS based on whether information indicative of LMCS is parsed.

In some examples, video decoder 300 may be configured to receive one or more syntax elements that indicate whether luma mapping and chroma scaling (LMCS) information is present in a syntax structure and parse LMCS information based on the one or more syntax elements.

In some examples, video encoder 200 may be configured to determine that adaptive loop filtering (ALF) is disabled for one or more blocks, avoid setting an adaptation parameter set (APS) type equal to an APS type corresponding to ALF based on the ALF being disabled for the one or more blocks, and signal information indicating that ALF is disabled for one or more blocks.

In some examples, video encoder 200 may be configured to determine that cross component adaptive loop filter (CCALF) for one or more blocks is disabled, avoid signaling of information indicative of CCALF for one or more blocks based on CCALF being disabled for the one or more blocks, and signal information indicative of CCALF being disabled for the one or more blocks.

In some examples, video encoder 200 may be configured to determine whether to signal a syntax element indicative of whether chroma filters are signaled based on a chroma array type for a block.

In some examples, video encoder 200 may be configured to determine whether to signal information indicative of luma mapping and chroma scaling (LMCS) based on chroma array type, and signal information indicative of LMCS based on the determination.

In some examples, video encoder 200 may be configured to signal one or more syntax elements that indicate whether luma mapping and chroma scaling (LMCS) information is present in a syntax structure and signal LMCS information based on the one or more syntax elements.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, In VVC draft 8, LMCS chroma scaling parameters are signaled for all chroma formats. However, these parameters are redundant to monochrome contents. For example, video encoder 200 may encode a syntax element (referred to as lmcs_delta_abs_crs) that is indicative of a value (referred to as lmcsDeltaCrs) for determining a scaling parameter for chroma scaling in LMCS. For example, lmcs_delta_abs_crs specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

Video decoder 300 may decode the syntax element (e.g., parse lmcs_delta_abs_crs) from the bitstream a value (e.g., lmcsDeltaCrs). For example, lmcsDeltaCrs equals (1−2*lmcs_delta_sign_crs_flag)*lmcs_delta_abs_crs.

Video encoder 200 may signal lmcs_delta_sign_crs_flag, in addition to lmcs_delta_abs_crs (e.g., when lmcs_delta_abs_crs is greater than 0). The lmcs_delta_sign_crs_flag may indicate if lmcsDeltaCrs is a positive or negative number. For example, if lmcs_delta_sign_crs_flag is 1, then (1−2*lmcs_delta_sign_crs_flag) is equal to −1 and lmcsDeltaCrs is a negative number (e.g., −1*lmcs_delta_abs_crs). If lmcs_delta_sign_crs_flag is 0, then (1−2*lmcs_delta_sign_crs_flag) is equal to 1 and lmcsDeltaCrs is a positive number (e.g., 1*lmcs_delta_abs_crs).

With lmcsDeltaCrs, video decoder 300 may determine the scaling parameter for chroma scaling in LMCS. For instance, video decoder 300 may perform the operations of the following pseudocode:

```
if( lmcsCW[ i ] = = 0 )
    ChromaScaleCoeff[ i ] =( 1 << 11 )
else
    ChromaScaleCoeff[ i ] = OrgCW * ( 1 << 11 ) / ( lmcsCW[ i ] +
    lmcsDeltaCrs )
```

In the above pseudocode, ChromaScaleCoeff may be considered as the scaling parameter for chroma scaling. In this way, video decoder 300 may determine the scaling parameter of chroma scaling for LMCS.

However, there may be instances where LMCS is enabled, but chroma scaling is not needed. For instance, for certain color formats, such as monochrome (also referred to 4:0:0 format), LMCS may be enabled, but there may be no need for chroma scaling because there are no chroma components. For monochrome, only luminance components may be needed, as there is no color components.

In some techniques, such as in VVC draft 8, even if chroma related syntax elements (e.g., chroma components) are not present (e.g., in monochrome color format), video encoder 200 may signal and video decoder 300 may parse the lmcs_delta_abs_crs syntax element. Including lmcs_delta_abs_crs syntax element, even when chroma components (e.g., chroma related syntax elements) are not present results in unnecessary signaling, and inefficient bandwidth utilization.

This disclosure describes example techniques to selectively signal lmcs_delta_abs_crs. The lmcs_delta_abs_crs syntax element is indicative of a value (e.g., lmcsDeltaCrs) for determining a scaling parameter (e.g., ChromaScaleCoeff) for chroma scaling in LMCS. For instance, video encoder 200 may determine whether chroma related syntax elements are present for LMCS. If chroma related syntax elements are present, video encoder 200 may encode (e.g., including signaling) the lmcs_delta_abs_crs syntax element. However, if chroma related syntax elements are not present for LMCS, video encoder 200 may not encode (e.g., bypass signaling) the lmcs_delta_abs_crs syntax element.

In one or more examples, video encoder 200 may also signal a flag that indicates whether chroma components are present for LMCS (e.g., whether chroma related syntax elements are present for LMCS). Video decoder 300 may receive the flag and determine whether chroma components are present for LMCS (e.g., whether chroma related syntax elements are present for LMCS). That is, video decoder 300 may determine whether chroma components are present for LMCS based on the flag.

If video decoder 300 determines that chroma components are present (e.g., chroma related syntax elements are present) for LMCS (e.g., based on the flag signaled by video encoder 200), video decoder 300 may decode (e.g., parse) a syntax element (e.g., lmcs_delta_abs_crs) when the chroma related syntax elements are present for LMCS. If, however, video decoder 300 determines that chroma related syntax elements are not present for LMCS (e.g., based on flag signaled by video encoder 200), video decoder 300 may bypass coding (e.g., bypass parsing) the lmcs_delta_abs_crs when chroma related syntax elements are not present for LMCS.

Accordingly, a video coder (e.g., video encoder 200 or video decoder 300) may determine that chroma related syntax elements are present for luma mapping with chroma scaling (LMCS) for a coding unit (CU). In the example where the video coder is video encoder 200, video encoder 200 may signal a flag indicating that chroma related syntax elements are present based on the determination that chroma related syntax elements are present. In the example where the video coder is video decoder 300, video decoder 300 may receive a flag indicating that chroma related syntax elements are present, and may determine that the chroma related syntax elements are present based on the flag.

The video coder may code (e.g., encode or decode) a syntax element when the chroma related syntax elements are present for LMCS for the CU. The syntax element is indicative of a value for determining a scaling parameter for chroma scaling in LMCS. For example, the syntax element may be lmcs_delta_abs_crs. The lmcs_delta_abs_crs syntax is indicative of a value for lmcsDeltaCrs (e.g., the value of lmcs_delta_abs_crs is equal to the absolute value of lmcsDeltaCrs). Stated another way, the syntax element (e.g., lmcs_delta_abs_crs) specifies an absolute codeword value of a variable (e.g., lmcsDeltaCrs) that is used for determining the scaling parameter (e.g., ChromaScaleCoeff) for chroma scaling. Hence, determining the scaling parameter is multiple steps that first includes determining lmcs_delta_abs_crs, from which lmcsDeltaCrs is determined, and then ChromaScaleCoeff is determined from lmcsDeltaCrs.

In examples where the video coder is video encoder 200, video encoder 200 may signal the syntax element (e.g., lmcs_delta_abs_crs) only when the chroma related syntax elements are present. In examples where the video coder is video decoder 300, video decoder 300 may pares the syntax element (e.g., lmcs_delta_abs_crs) based on the determination that chroma related syntax elements are present (e.g., based on the flag indicating that chroma components are present).

The video coder may code the syntax element (e.g., lmcs_delta_abs_crs) in an LMCS syntax structure (e.g., lmcs_data( )) in an adaptation parameter set (APS). Also, as described above, video encoder 200 may signal and video decoder 300 may parse a flag that indicates whether chroma related syntax elements are present. In one or more examples, the flag may be referred to as lmcs_cs_present_flag (also called aps_chroma_present_flag). The lmcs_cs_present_flag may also be signaled and parsed in the APS.

The video coder may code a chroma block of the CU based on the scaling parameter (e.g., ChromaScaleCoeff) for chroma scaling. In examples where the video coder is video encoder 200, video encoder 200 may determine a chroma prediction block, and subtract the chroma prediction block from chroma block to generate a residual block. Video encoder 200 may scale the residual block to generate a scaled residual block based on the scaling parameter (e.g., for LMCS), and signal information indicative of the scaled residual block. In examples where the video coder is video decoder 300, video decoder 300 may inverse scale a scaled residual chroma block based on the scaling parameter to generate a residual chroma block. Video decoder 300 may determine a chroma prediction block, and add the residual chroma block to the chroma prediction block to reconstruct the chroma block.

In the above example of the CU (e.g., a first CU), chroma related syntax elements may be present. However, for a second CU, it may be possible that chroma related syntax elements are not present. For example, the video coder may determine that chroma related syntax elements are not present for LMCS for a second CU. For instance, for the second CU, video encoder 200 may signal and video decoder 300 may parse a flag (e.g., lmcs_cs_present_flag (also called aps_chroma_present_flag)) that indicates that chroma related syntax elements are not present for LMCS for the second CU.

In such examples, the video coder may bypass coding of the syntax element when the chroma related syntax elements are not present for LMCS for the second CU. For instance, video encoder 200 may avoid signaling (e.g., bypass signaling) the lmcs_delta_abs_crs syntax element. Video decoder 300 may avoid parsing (e.g., bypass parsing) the lmcs_delta_abs_crs syntax element. That is, video decoder

300 may determine that the bits that would normally be for the lmcs_delta_abs_crs syntax element belong to another syntax element when lmcs_cs_present_flag indicates that chroma related syntax elements are not present.

As described above, chroma related syntax elements being present may be indicative of chroma components are present. Similarly, chroma related syntax elements not being present may be indicative of chroma components not being present.

This disclosure also describes examples of constraints for video encoder 200 in forming a conforming bitstream. For instance, the lmcs_delta_abs_crs syntax element may be considered as a first syntax element. In some examples, video encoder 200 may determine a value of a second syntax element, which is signaled in an APS for the CU, for specifying a number of bits used for representation of a third syntax element for LMCS. In some examples, the value for the second syntax element is constrained to a range of 0 to a value based on a bit depth. One example of the second syntax element is lmcs_delta_cwprec_minus1, and one example of the third syntax element is lmcs_delta_abs_cw [i].

This disclosure also describes examples for adaptive loop filtering (ALF), such as cross component ALF (CCALF). For example, video encoder 200 may determine that a sequence parameter set (SPS) indicates that CCALF is disabled. In such examples, video encoder 200 may set at least one flag in an APS specifying that cross-component filters for a chroma component are not signaled when the SPS indicates that CCALF is disabled. That is, when CCALF is disabled in the SPS, video encoder 200 may ensure that the flags in the APS that specify whether cross-component filters are signaled or not indicate that cross-component filters are not signaled.

The following describes various example techniques, and changes to the VVC Draft 8. In the following, additions relative to VVC Draft 8 are represented as text between <ADD> . . . </ADD> and deletions are represented as text between <DELETE> . . . </DELETE>.

For the APS type constraint, when a tool is disabled, for example in SPS, an APS with corresponding tool type may not be present in a bit stream. The example techniques are described as the following semantics. The syntax element aps_params_type specifies the type of APS parameters carried in the APS as specified in Table 1.

TABLE 1

APS parameters type codes and types of APS parameters

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 . . . 7 | Reserved | Reserved |

<ADD> When sps_alf_enabled_flag is equal to 0, aps_params_type shall not be equal to ALF_APS. When sps_lmcs_enabled_flag is equal to 0, aps_params_type shall not be equal to LMCS_APS. When sps_scaling_list_enabled_flag is equal to 0, aps_params_type shall not be equal to SCALING_APS. </ADD>. The above constraints may be expressed as a bitstream conformance constraints.

For CCALF filter constraint in ALF_APS, when CCALF is disabled, for example in SPS, CCALF filter information shall not be present in a bit stream, such as an ALF_APS in VVC. The example techniques are described as the following semantics.

| | Descriptor |
|---|---|
| alf_data( ) { | |
|   alf_luma_filter_signal_flag | u(1) |
|   alf_chroma_filter_signal_flag | u(1) |
|   alf_cc_cb_filter_signal_flag | u(1) |
|   alf_cc_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) | |
|       for( filtIdx = 0; filtIdx < NumAlfFilters; filtIdx++ ) | |
|         alf_luma_coeff_delta_idx[ filtIdx ] | u(v) |
|     for( sfIdx = 0; sfIdx <= alf_luma_num_filters_signalled_minus1; sfIdx++ ) | |
|       for( j = 0; j < 12; j++ ) { | |
|         alf_luma_coeff_abs[ sfIdx ][ j ] | ue(v) |
|         if( alf_luma_coeff_abs[ sfIdx ][ j ] ) | |
|           alf_luma_coeff_sign[ sfIdx ][ j ] | u(1) |
|       } | |
|     if( alf_luma_clip_flag ) | |
|       for( sfIdx = 0; sfIdx <= alf_luma_num_filters_signalled_minus1; sfIdx++ ) | |
|         for( j = 0; j < 12; j++ ) | |
|           alf_luma_clip_idx[ sfIdx ][ j ] | u(2) |
|   } | |
|   if( alf_chroma_filter_signal_flag ) { | |
|     alf_chroma_clip_flag | u(1) |
|     alf_chroma_num_alt_filters_minus1 | ue(v) |
|     for( altIdx = 0; altIdx <= alf_chroma_num_alt_filters_minus1; altIdx++ ) | |
|     { | |
|       for( j = 0; j < 6; j++ ) { | |
|         alf_chroma_coeff_abs[ altIdx ][ j ] | ue(v) |
|         if( alf_chroma_coeff_abs[ altIdx ][ j ] > 0 ) | |
|           alf_chroma_coeff_sign[ altIdx ][ j ] | u(1) |
|       } | |
|     if( alf_chroma_clip_flag ) | |

-continued

| | Descriptor |
|---|---|
|       for( j = 0; j < 6; j++ ) | |
|           alf_chroma_clip_idx[ altIdx ][ j ] | u(2) |
|     } | |
| } | |
| if( alf_cc_cb_filter_signal_flag ) { | |
|     alf_cc_cb_filters_signalled_minus1 | ue(v) |
|     for( k = 0; k < alf_cc_cb_filters_signalled_minus1 + 1; k++ ) { | |
|       for( j = 0; j < 7; j++ ) { | |
|         alf_cc_cb_mapped_coeff_abs[ k ][ j ] | u(3) |
|         if( alf_cc_cb_mapped_coeff_abs[ k ][ j ] ) | |
|           alf_cc_cb_coeff_sign[ k ][ j ] | u(1) |
|       } | |
|     } | |
| } | |
| if( alf_cc_cr_filter_signal_flag ) { | |
|     alf_cc_cr_filters_signalled_minus1 | ue(v) |
|     for( k = 0; k < alf_cc_cr_filters_signalled_minus1 + 1; k++ ) { | |
|       for( j = 0; j < 7; j++ ) { | |
|         alf_cc_cr_mapped_coeff_abs[ k ][ j ] | u(3) |
|         if( alf_cc_cr_mapped_coeff_abs[ k ][ j ] ) | |
|           alf_cc_cr_coeff_sign[ k ][ j ] | u(1) |
|       } | |
|     } | |
| } | |
| } | |

For the semantic constraint:

alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. When <DELETE> ChromaArrayType </DELETE> <ADD> sps_ccalf_enabled_flag </ADD> is equal to 0, alf_cc_cb_filter_signal_flag shall be equal to 0.

alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. When <DELETE> ChromaArrayType </DELETE> <ADD> sps_ccalf_enabled_flag </ADD> is equal to 0, alf_cc_cr_filter_signal_flag shall be equal to 0.

In some examples, there may be instances for conditionally signaling based on sps_ccalf_enabled_flag. The CCALF filters may be conditionally signaled according to sps_ccalf_enabled_flag. When sps_ccalf_enabled_flag is false, there is no need to signal CCALF filters. In VVC Draft 8, in this case, alf_cc_cb/cr_filter_signal_flags may not be present in bit stream and inferred to be 0 at decoder.

| | Descriptor |
|---|---|
| alf_data( ) { | |
|     alf_luma_filter_signal_flag | u(1) |
|     alf_chroma_filter_signal_flag | u(1) |
|     <ADD> if( sps_ccalf_enabled_flag ) { </ADD> | |
|       alf_cc_cb_filter_signal_flag | u(1) |
|       alf_cc_cr_filter_signal_flag | u(1) |
|     } | |
|     ... | |
| } | | alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. <ADD> When alf_cc_cb_filter_signal_flag is not present, it is inferred to be equal to 0. </ADD> alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. <ADD> When alf_cc_cr_filter_signal_flag is not present, it is inferred to be equal to 0. </ADD>

In some examples, there may be conditional signaling based on sps_ccalf_enabled_flag. The CCALF filters may be conditionally signalled based on ChromaArrayType (e.g., chroma array type). When sps_ccalf_enabled_flag is false, there may be no need to signal CCALF filters. In VVC Draft 8, in this case, alf_cc_cb/cr_filter_signal_flags may not be present in bit stream and inferred to be 0 at decoder.

| | Descriptor |
|---|---|
| alf_data( ) { | |
|     alf_luma_filter_signal_flag | u(1) |
|     alf_chroma_filter_signal_flag | u(1) |
|     <ADD> if( ChromaArrayType ) { </ADD> | |
|       alf_cc_cb_filter_signal_flag | u(1) |
|       alf_cc_cr_filter_signal_flag | u(1) |
|     } | |
|     ... | |
| } | | alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. <ADD> When alf_cc_cb_filter_signal_flag is not present, it is inferred to be equal to 0. </ADD> alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. <ADD> When alf_cc_cr_filter_signal_flag is not present, it is inferred to be equal to 0. </ADD>

In some examples, conditional signaling may be based on sps_ccalf_enabled_flag and ChromaArrayType. The CCALF filters may be conditionally signalled based on sps_ccalf_enabled_flag and ChromaArrayType. When sps_ccalf_enabled_flag is false or ChromaArrayType is false, there may be no need to signal CCALF filters. In VVC Draft 8, in this case, alf_cc_cb/cr_filter_signal_flags may not be present in bit stream and inferred to be 0 at decoder

|  | Descriptor |
|---|---|
| alf_data( ) { |  |
|    alf_luma_filter_signal_flag | u(1) |
|    alf_chroma_filter_signal_flag | u(1) |
| <ADD>  if( ChromaArrayType \|\| sps_ccalf_enabled_flag) {</ADD> |  |
|      alf_cc_cb_filter_signal_flag | u(1) |
|      alf_cc_cr_filter_signal_flag | u(1) |
|   } |  |
| ... |  |
| } |  | alf_cc_cb_filter_signal_flag equal to 1 specifies that cross-component filters for the Cb colour component are signalled. alf_cc_cb_filter_signal_flag equal to 0 specifies that cross-component filters for Cb colour component are not signalled. <ADD> When alf_cc_cb_filter_signal_flag is not present, it is inferred to be equal to 0. </ADD> alf_cc_cr_filter_signal_flag equal to 1 specifies that cross-component filters for the Cr colour component are signalled. alf_cc_cr_filter_signal_flag equal to 0 specifies that cross-component filters for the Cr colour component are not signalled. <ADD> When alf_cc_cr_filter_signal_flag is not present, it is inferred to be equal to 0. </ADD>

In some examples, alf_chroma_filters may be conditionally signalled based on ChromaArrayType. In addition or in alternative, chroma ALF may be conditionally signaled based on ChromaArrayType. When ChromaArrayType is false, there may be no need to signal chroma ALF filters. In VVC Draft 8, in this case, alf_chroma_filter_signal_flags may not be present in bit stream and inferred to be 0 at decoder.

|  | Descriptor |
|---|---|
| alf_data( ) { |  |
|    alf_luma_filter_signal_flag | u(1) |
| <ADD>  if( ChromaArrayType ) </ADD> |  |
|      alf_chroma_filter_signal_flag | u(1) |
|   ... |  |
| } |  | alf_chroma_filter_signal_flag equal to 1 specifies that a chroma filter is signalled. alf_chroma_filter_signal_flag equal to 0 specifies that a chroma filter is not signalled. <ADD> When not present, alf_chroma_filter_signal_flag is inferred to be equal to 0. </ADD>

In some examples, there may be chroma deblocking filter parameter signaling for monochrome. A constraint for deblocking tc and beta offsets for Cb and Cr for monochrome contents may be added. One or more, including any, of the following techniques may be applied to PPS (picture parameter set), PH (picture header) and/or SH (slice header).

For the semantic constraints, in one example, for monochrome contents, semantic constraints may be added in order to constrain the values of deblocking tc and beta offsets for Cb and Cr to be 0.

pps_cb_beta_offset_div2 and pps_cb_tc_offset_div2 specify the default deblocking parameter offsets for β and tC (divided by 2) that are applied to the Cb component for slices referring to the PPS, unless the default deblocking parameter offsets are overridden by the deblocking parameter offsets present in the picture headers or the slice headers of the slices referring to the PPS. The values of pps_cb_beta_offset_div2 and pps_cb_tc_offset_div2 shall both be in the range of −12 to 12, inclusive. When not present <ADD> or ChromaArrayType is equal to 0</ADD>, the values of pps_cb_beta_offset_div2 and pps_cb_tc_offset_div2 are both inferred to be equal to 0.

pps_cr_beta_offset_div2 and pps_cr_tc_offset_div2 specify the default deblocking parameter offsets for β and tC (divided by 2) that are applied to the Cr component for slices referring to the PPS, unless the default deblocking parameter offsets are overridden by the deblocking parameter offsets present in the picture headers or the slice headers of the slices referring to the PPS. The values of pps_cr_beta_offset_div2 and pps_cr_tc_offset_div2 shall both be in the range of −12 to 12, inclusive. When not present <ADD> or ChromaArrayType is equal to 0</ADD>, the values of pps_cr_beta_offset_div2 and pps_cr_tc_offset_div2 are both inferred to be equal to 0.

The following describes conditionally signaling for some examples where monochrome content is used. For monochrome contents, deblocking tc and beta offsets for Cb and Cr components may not be present in bit stream.

This disclosure also describes conditionally signaling based on chroma format and flags. Deblocking tc and beta offsets for Cb and Cr may be conditionally signaled based on some signaled flags. For example, <ADD> pps_chroma_tool_offsets_present_flag </ADD> could be reused for chroma deblocking filter. Alternatively, and new flag instead of the reusing pps_chroma_tool_offsets_present_flag indicating the presence of chroma deblocking offsets may be introduced. The flag for example can be signaled in PPS and/or picture and/or slice headers.

Picture parameter set:

|  |  |
|---|---|
| if( !pps_deblocking_filter_disabled_flag ) { |  |
|    pps_beta_offset_div2 | se(v) |
|    pps_tc_offset_div2 | se(v) |
|   <ADD> if( ChromaArrayType != 0 \|\| pps_chroma_tool_offsets_present_flag ) { </ADD> |  |
|      pps_cb_beta_offset_div2 | se(v) |
|      pps_cb_tc_offset_div2 | se(v) |
|      pps_cr_beta_offset_div2 | se(v) |
|      pps_cr_tc_offset_div2 | se(v) |
|   } |  |
| } |  |

Picture header:

|  |  |
|---|---|
| if( !ph_deblocking_filter_disabled_flag ) { |  |
|    ph_beta_offset_div2 | se(v) |
|    ph_tc_offset_div2 | se(v) |
|   <ADD> if( ChromaArrayType != 0 \|\| pps_chroma_tool_offsets_present_flag ) { </ADD> |  |
|      ph_cb_beta_offset_div2 | se(v) |
|      ph_cb_tc_offset_div2 | se(v) |
|      ph_cr_beta_offset_div2 | se(v) |
|      ph_cr_tc_offset_div2 | se(v) |
|   } |  |
| } |  |

Slice header:

|  |  |
|---|---|
| if( !slice_deblocking_filter_disabled_flag ) { |  |
|    slice_beta_offset_div2 | se(v) |
|    slice_tc_offset_div2 | se(v) |

-continued

|  | |
|---|---|
| <ADD> if( ChromaArrayType != 0 \|\|<br>pps_chroma_tool_offsets_present_flag ) { </ADD><br>    slice_cb_beta_offset_div2<br>    slice_cb_tc_offset_div2<br>    slice_cr_beta_offset_div2<br>    slice_cr_tc_offset_div2<br>    }<br>} | se(v)<br>se(v)<br>se(v)<br>se(v) |

The semantics of pps_chroma_tool_offsets_present_flag may be updated to reflect the usage in PH and SH as follows.

pps_chroma_tool_offsets_present_flag equal to 1 specifies that chroma tool offsets related syntax elements are present in the PPS RBSP syntax structure <ADD> and the related syntax elements are present in PH and SH referring to the PPS. </ADD> pps_chroma_tool_offsets_present_flag equal to 0 specifies that chroma tool offsets related syntax elements are not present in in the PPS RBSP, <ADD> PH, and SH </ADD> syntax structures. When ChromaArrayType is equal to 0, the value of pps_chroma_tool_offsets_present_flag shall be equal to 0.

For luma mapping and chroma scaling (LMCS) chroma scaling parameters signaling in LMCS_APS, there may be some changes. The following describes modification of lmcs_delta_cwprec_minus1 signaling. To decouple LMCS_APS signaling with SPS and avoiding infinite value of lmcs_delta_cw_prec_minus1 at video decoder 300, lmcs_delta_cw_prec_minus1 may be signalled with fixed length code, such as u(4).

|  | Descriptor |
|---|---|
| lmcs_data( ) {<br>  lmcs_min_bin_idx<br>  lmcs_delta_max_bin_idx<br>  lmcs_delta_cw_prec_minus1<br><br>  for( i = lmcs_min_bin_idx; i <= LmcsMaxBinIdx;<br>  i++ ) {<br>    lmcs_delta_abs_cw[ i ]<br>    if( lmcs_delta_abs_cw[ i ] > 0 )<br>      lmcs_delta_sign_cw_flag[ i ]<br>  }<br>  lmcs_delta_abs_crs<br>  if( lmcs_delta_abs_crs > 0 )<br>    lmcs_delta_sign_crs_flag<br>} | <br>ue(v)<br>ue(v)<br><ADD><br>u(4) </ADD><br><br><br>u(v)<br><br>u(1)<br><br>u(3)<br><br>u(1) |

Conditionally signaling chroma scaling may be performed by adding some semantic constraint. For example, lmcs_delta_abs_crs specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0. <ADD> When ChromaArrayType is equal to 0, lmcs_delta_abs_crs shall be equal to 0. </ADD>

The following describes conditionally signaling for chroma scaling by chroma format.

|  | Descriptor |
|---|---|
| lmcs_data( ) {<br>  lmcs_min_bin_idx<br>  lmcs_delta_max_bin_idx<br>  lmcs_delta_cw_prec_minus1<br>  for( i = lmcs_min_bin_idx; i <= LmcsMaxBinIdx;<br>  i++ ) { | <br>ue(v)<br>ue(v)<br>ue(v) |

-continued

|  | Descriptor |
|---|---|
|     lmcs_delta_abs_cw[ i ]<br>    if( lmcs_delta_abs_cw[ i ] > 0 )<br>      lmcs_delta_sign_cw_flag[ i ]<br>  }<br>  <ADD> if ( ChromaArrayType !=0) { </ADD><br>    lmcs_delta_abs_crs<br>    if( lmcs_delta_abs_crs > 0 )<br>      lmcs_delta_sign_crs_flag<br>  }<br>} | u(v)<br><br>u(1)<br><br><br>u(3)<br><br>u(1) | lmcs_delta_abs_crs specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

2.4.4 Conditionally Signalling Chroma Scaling by Another Signalling Flag

|  | Descriptor |
|---|---|
| lmcs_data( ) {<br>  lmcs_min_bin_idx<br>  lmcs_delta_max_bin_idx<br>  lmcs_delta_cw_prec_minus1<br>  for( i = lmcs_min_bin_idx; i <= LmcsMaxBinIdx;<br>  i++ ) {<br>    lmcs_delta_abs_cw[ i ]<br>    if( lmcs_delta_abs_cw[ i ] > 0 )<br>      lmcs_delta_sign_cw_flag[ i ]<br>  }<br>  <ADD> lmcs_cs_present_flag </ADD><br><br>  <ADD> if( lmcs_cs_present_flag ) { </ADD><br>    lmcs_delta_abs_crs<br>    if( lmcs_delta_abs_crs > 0 )<br>      lmcs_delta_sign_crs_flag<br>  }<br>} | <br>ue(v)<br>ue(v)<br>ue(v)<br><br><br>u(v)<br><br>u(1)<br><br><ADD><br>u(1) </ADD><br><br>u(3)<br><br>u(1) |

<ADD> lmcs_cs_present_flag is equal to 1 specifies that lmcs_delta_abs_crs is present in LMCS_APS. lmcs_cs_present_flag is equal to 0 specifies that lmcs_delta_abs_crs is not present in LMCS_APS. When ChromaArrayType is equal to 0, lmcs_cs_present_flag shall be equal to 0. </ADD> lmcs_delta_abs_crs specifies the absolute codeword value of the variable lmcsDeltaCrs. The value of lmcs_delta_abs_crs shall be in the range of 0 and 7, inclusive. When not present, lmcs_delta_abs_crs is inferred to be equal to 0.

The following describes conditionally signaling chroma scaling list based on chroma format. Chroma scaling list parameters may not be signaled for monochrome contents. In VVC, scaling_list_chroma_present_flag may not be present in bit stream for monochrome contents and inferred to be 0 at video decoder 300.

|  | Descriptor |
|---|---|
| scaling_list_data( ) {<br>  scaling_matrix_for_lfnst_disabled_flag<br>  if (ChromaArrayType != 0)<br>    scaling_list_chroma_present_flag<br>  .... | <br>u(1)<br><br>u(1) | scaling_list_chroma_present_flag equal to 1 specifies that chroma scaling lists are present in scaling_list_data( ). scaling_list_chroma_present_flag equal to 0 specifies that chroma scaling lists are not present in scaling_list_data( ). <ADD> When not present, it is inferred to be equal to 0. </ADD>

The following describes dependency between PPS, APS and PPS. The syntax constraint dependent on SPS, from PPS and APS may be moved to where the syntax elements are referred, such as in PH and SH.

For LMCS, the constraint on the value of lmcs_delta_cw_prec_minus1 may be checked when the LMCS is referred. In one example, lmcs_delta_cw_prec_minus1 may be signalled with fixed length code, such as u(4).

|  | Descriptor |
|---|---|
| lmcs_data( ) { |  |
|    lmcs_min_bin_idx | ue(v) |
|    lmcs_delta_max_bin_idx | ue(v) |
|    lmcs_delta_cw_prec_minus1 | u(4) |
|    for( i = lmcs_min_bin_idx; i <= LmcsMaxBinIdx; i++ ) { |  |
|       lmcs_delta_abs_cw[ i ] | u(v) |
|       if( lmcs_delta_abs_cw[ i ] > 0 ) |  |
|          lmcs_delta_sign_cw_flag[ i ] | u(1) |
|    } |  |
|    lmcs_delta_abs_crs | u(3) |
|    if( lmcs_delta_abs_crs > 0 ) |  |
|       lmcs_delta_sign_crs_flag | u(1) |
| } |  |

<ADD> It is required that, when ph_lmcs_aps_id is present, the value of lmcs_delta_cw_prec_minus1 of the APS NAL unit having aps_params_type equal to LMCS_APS and adaptation_parameter_set_id equal to ph_lmcs_aps_id shall be in the range of 0 to BitDepth−2, inclusive. </ADD>

In another example,

|  | Descriptor |
|---|---|
| lmcs_data( ) { |  |
|    lmcs_min_bin_idx | ue(v) |
|    lmcs_delta_max_bin_idx | ue(v) |
|    lmcs_delta_cw_prec_minus1 | ue(v) |
|    for( i = lmcs_min_bin_idx; i <= LmcsMaxBinIdx; i++ ) { |  |
|       lmcs_delta_abs_cw[ i ] | u(v) |
|       if( lmcs_delta_abs_cw[ i ] > 0 ) |  |
|          lmcs_delta_sign_cw_flag[ i ] | u(1) |
|    } |  |
|    lmcs_delta_abs_crs | u(3) |
|    if( lmcs_delta_abs_crs > 0 ) |  |
|       lmcs_delta_sign_crs_flag | u(1) |
| } |  | lmcs_delta_cw_prec_minus1 plus 1 specifies the number of bits used for the representation of the syntax lmcs_delta_abs_cw[i]. The value of lmcs_delta_cwprec_minus1 shall be in the range of 0 to <ADD> max_lmcs_delta_cwprec_minus1 </ADD>, inclusive. <ADD> max_lmcs_delta_cwprec_minus1 </ADD> is a fixed value for all bit stream. For example, max_lmcs_delta_cwprec_minus1 could be 14.

<ADD> It is required that, when ph_lmcs_aps_id is present, the value of lmcs_delta_cw_prec_minus1 of the APS NAL unit having aps_params_type equal to LMCS_APS and adaptation_parameter_set_id equal to ph_lmcs_aps_id shall be in the range of 0 to BitDepth−2, inclusive. </ADD>

The following describes conditionally signaling chroma scaling by another signalling flag

|  | Descriptor |
|---|---|
| lmcs_data( ) { |  |
|    lmcs_min_bin_idx | ue(v) |
|    lmcs_delta_max_bin_idx | ue(v) |
|    lmcs_delta_cw_prec_minus1 | ue(v) |
|    for( i = lmcs_min_bin_idx; i <= LmcsMaxBinIdx; i++ ) { |  |
|       lmcs_delta_abs_cw[ i ] | u(v) |
|       if( lmcs_delta_abs_cw[ i ] > 0 ) |  |
|          lmcs_delta_sign_cw_flag[ i ] | u(1) |
|    } |  |
| <ADD> lmcs_cs_present_flag </ADD> | u(1) |
| <ADD> if( lmcs_cs_present_flag ) { </ADD> |  |
|    lmcs_delta_abs_crs | u(3) |
|    if( lmcs_delta_abs_crs > 0 ) |  |
|       lmcs_delta_sign_crs_flag | u(1) |
| } |  |
|    } |  |

<ADD> lmcs_cs_present_flag is equal to 1 specifies that lmcs_delta_abs_crs is present in LMCS_APS. lmcs_cs_present_flag is equal to 0 specifies that lmcs_delta_abs_crs is not present in LMCS_APS. </ADD>

<ADD> It is required that, when ph_lmcs_aps_id is present, the value of lmcs_cs_present_flag of the APS NAL unit having aps_params_type equal to LMCS_APS and adaptation_parameter_set_id equal to ph_lmcs_aps_id shall be equal to 0 if ChromaArrayType is equal to 0 and shall be 1 otherwise. </ADD>.

The following describes techniques related to ALF. When an ALF_APS is referred in a bit stream, such as at PH, SH, a block and a sample, if sps_ccalf_enabled_flag is false, the ALF_APS shall not contain any CCALF filters.

slice_alf_aps_id_luma[i] specifies the adaptation_parameter_set_id of the i-th ALF_APS that the luma component of the slice refers to. When slice_alf_enabled_flag is equal to 1 and slice_alf_aps_id_luma[i] is not present, the value of slice_alf_aps_id_luma[i] is inferred to be equal to the value of ph_alf_aps_id_luma[i].

<ADD> When slice_alf_aps_id_luma[i] is present, the following applies: </ADD>
  a. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit.
  b. The value of alf_luma_filter_signal_flag of the APS NAL unit having aps_params_type equal to ALF_APS and adaptation_parameter_set_id equal to slice_alf_aps_id_luma[i] shall be equal to 1.
  c. <ADD> When sps_ccalf_enabled_flag is equal to 0, the values of alf_cc_cb_filter_signal_flag and alf_cc_cr_filter_signal_flag of the APS NAL unit having aps_params_type equal to ALF_APS and adaptation_parameter_set_id equal to slice_alf_aps_id_luma[i] shall all be equal to 0. </ADD> slice_alf_aps_id_chroma specifies the adaptation_parameter_set_id of the ALF APS that the chroma component of the slice refers to. When slice_alf_enabled_flag is equal to 1 and slice_alf_aps_id_chroma is not present, the value of slice_alf_aps_id_chroma is inferred to be equal to the value of ph_alf_aps_id_chroma.

<ADD> When slice_alf_aps_id_chroma is present, the following applies: </ADD>
  a. The TemporalId of the APS NAL unit having aps_params_type equal to ALF_APS and adaptation_ parameter_set_id equal to slice_alf_aps_id_chroma shall be less than or equal to the TemporalId of the coded slice NAL unit.
  b. The value of alf_chroma_filter_signal_flag of the APS NAL unit having aps_params_type equal to ALF_APS and adaptation_parameter_set_id equal to slice_alf_aps_id_chroma shall be equal to 1.
  c. <ADD> When sps_ccalf_enabled_flag is equal to 0, the values of alf_cc_cb_filter_signal_flag and alf_cc_cr_filter_signal_flag of the APS NAL unit having aps_params_type equal to ALF_APS and adaptation_parameter_set_id equal to slice_alf_aps_id_chroma shall all be equal to 0. </ADD> ph_alf_aps_id_luma[i] specifies the adaptation_parameter_set_id of the i-th ALF_APS that the luma component of the slices associated with the PH refers to.

<ADD> When ph_alf_aps_id_luma[i] is present, the following applies: </ADD>
  a. The value of alf_luma_filter_signal_flag of the APS NAL unit having aps_params_type equal to ALF_APS and adaptation_parameter_set_id equal to ph_alf_aps_id_luma[i] shall be equal to 1.
  b. The TemporalId of the APS NAL unit having aps_params_type equal to ALF_APS and adaptation_parameter_set_id equal to ph_alf_aps_id_luma[i] shall be less than or equal to the TemporalId of the picture associated with the PH.
  c. <ADD> When sps_ccalf_enabled_flag is equal to 0, the values of alf_cc_cb_filter_signal_flag and alf_cc_cr_filter_signal_flag of the APS NAL unit having aps_params_type equal to ALF_APS and adaptation_parameter_set_id equal to ph_alf_aps_id_luma[i] shall all be equal to 0. </ADD> ph_alf_aps_id_chroma specifies the adaptation_parameter_set_id of the ALF APS that the chroma component of the slices associated with the PH refers to.

<ADD> When ph_alf_aps_id_chroma is present, the following applies: </ADD>
  a. The value of alf_chroma_filter_signal_flag of the APS NAL unit having aps_params_type equal to ALF_APS and adaptation_parameter_set_id equal to ph_alf_aps_id_chroma shall be equal to 1.
  b. The TemporalId of the APS NAL unit having aps_params_type equal to ALF_APS and adaptation_parameter_set_id equal to ph_alf_aps_id_chroma shall be less than or equal to the TemporalId of the picture associated with the PH.
  c. <ADD> When sps_ccalf_enabled_flag is equal to 0, the values of alf_cc_cb_filter_signal_flag and alf_cc_cr_filter_signal_flag of the APS NAL unit having aps_params_type equal to ALF_APS and adaptation_parameter_set_id equal to ph_alf_aps_id_chroma shall all be equal to 0. </ADD>

The following describes related to chroma QP offset. In slice header,

```
if( pps_slice_chroma_qp_offsets_present_flag ) {
    slice_cb_qp_offset                              se(v)
    slice_cr_qp_offset                              se(v)
    if( sps_joint_cbcr_enabled_flag )
        slice_joint_cbcr_qp_offset                  se(v)
}
```

In some examples, when pps_slice_chroma_qp_offsets_present_flag is used and current content is monochrome, the value of pps_slice_chroma_qp_offsets_present_flag should be 0.

```
if( pps_cu_chroma_qp_offset_list_enabled_flag )
    cu_chroma_qp_offset_enabled_flag                u(1)
```

In some examples, when pps_cu_chroma_qp_offset_list_enabled_flag is used and current content is monochrome, the value of pps_cu_chroma_qp_offset_list_enabled_flag should be 0.

Alternatively or additionally, slice_qp_offsets for chroma components may be conditionally signaled only when both pps_slice_chroma_qp_offsets_present_flag is true and current content is not monochrome. If current content is monochrome, slice qp offsets for chroma components shall not be signalled.

```
if( pps_slice_chroma_qp_offsets_present_flag <ADD>
&& ChromaArrayType </ADD>) {
    slice_cb_qp_offset                              se(v)
    slice_cr_qp_offset                              se(v)
    if( sps_joint_cbcr_enabled_flag )
        slice_joint_cbcr_qp_offset                  se(v)
}
``` cu_chroma_qp_offset_enabled_flag for chroma components may be conditionally signalled only when both pps_cu_chroma_qp_offset_list_enabled_flag is true and current content is not monochrome. If current content is monochrome, cu_chroma_qp_offset_enabled_flag for chroma components shall not be signaled.

```
if( pps_cu_chroma_qp_offset_list_enabled_flag <ADD>
&& ChromaArrayType </ADD>)
    cu_chroma_qp_offset_enabled_flag                u(1)
```

In PH,

```
if( pps_cu_chroma_qp_offset_list_enabled_flag )
    ph_cu_chroma_qp_offset_subdiv_intra_slice       ue(v)
```

```
if( pps_cu_chroma_qp_offset_list_enabled_flag )
    ph_cu_chroma_qp_offset_subdiv_inter_slice       ue(v)
```

In some examples, when pps_cu_chroma_qp_offset_list_enabled_flag is used and current content is monochrome, the value of pps_cu_chroma_qp_offset_list_enabled_flag should be 0.

Alternatively or additionally, ph_cu_chroma_qp_offset_subdiv_intra_slice and ph_cu_chroma_qp_offset_subdiv_inter_slice for chroma components may be conditionally signalled only when both pps_slice_chroma_qp_offsets_present_flag is true and current content is not monochrome. If current content is monochrome, ph_cu_chroma_qp_offset_subdiv_intra_slice and ph_cu_chroma_qp_offset_subdiv_inter_slice for chroma components shall not be signaled.

```
if( pps_cu_chroma_qp_offset_list_enabled_flag <ADD>
&& ChromaArrayType </ADD>)
    ph_cu_chroma_qp_offset_subdiv_intra_slice       ue(v)
```

```
if( pps_cu_chroma_qp_offset_list_enabled_flag <ADD>
&& ChromaArrayType </ADD>)
    ph_cu_chroma_qp_offset_subdiv_inter_slice          ue(v)
```

Figure 2A:
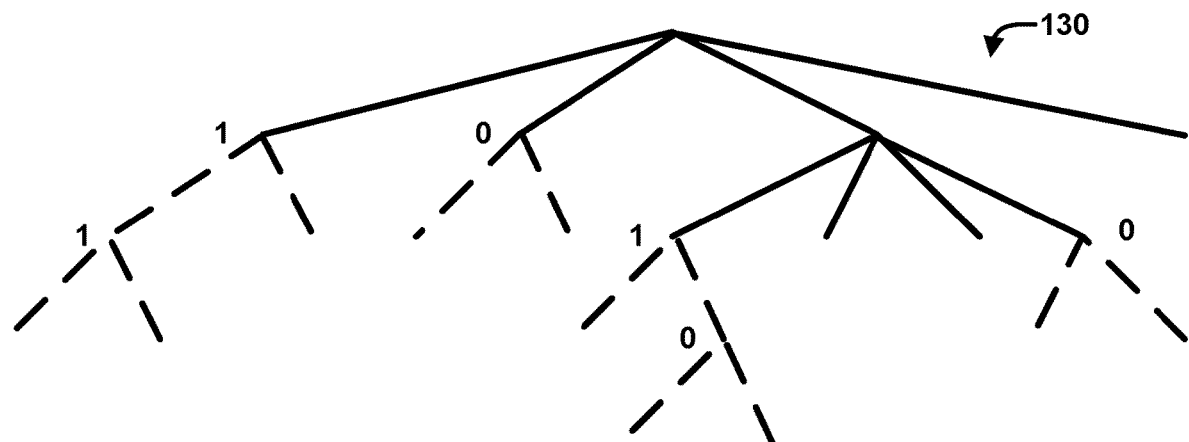
FIGS. 2A and 2B are conceptual diagrams illustrating an example quadtree binary tree (QTBT) structure, and a corresponding coding tree unit (CTU).
Figure 2B:
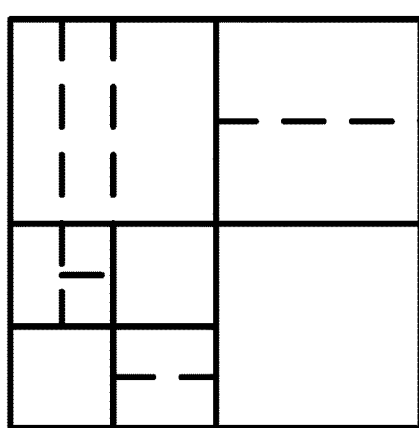

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
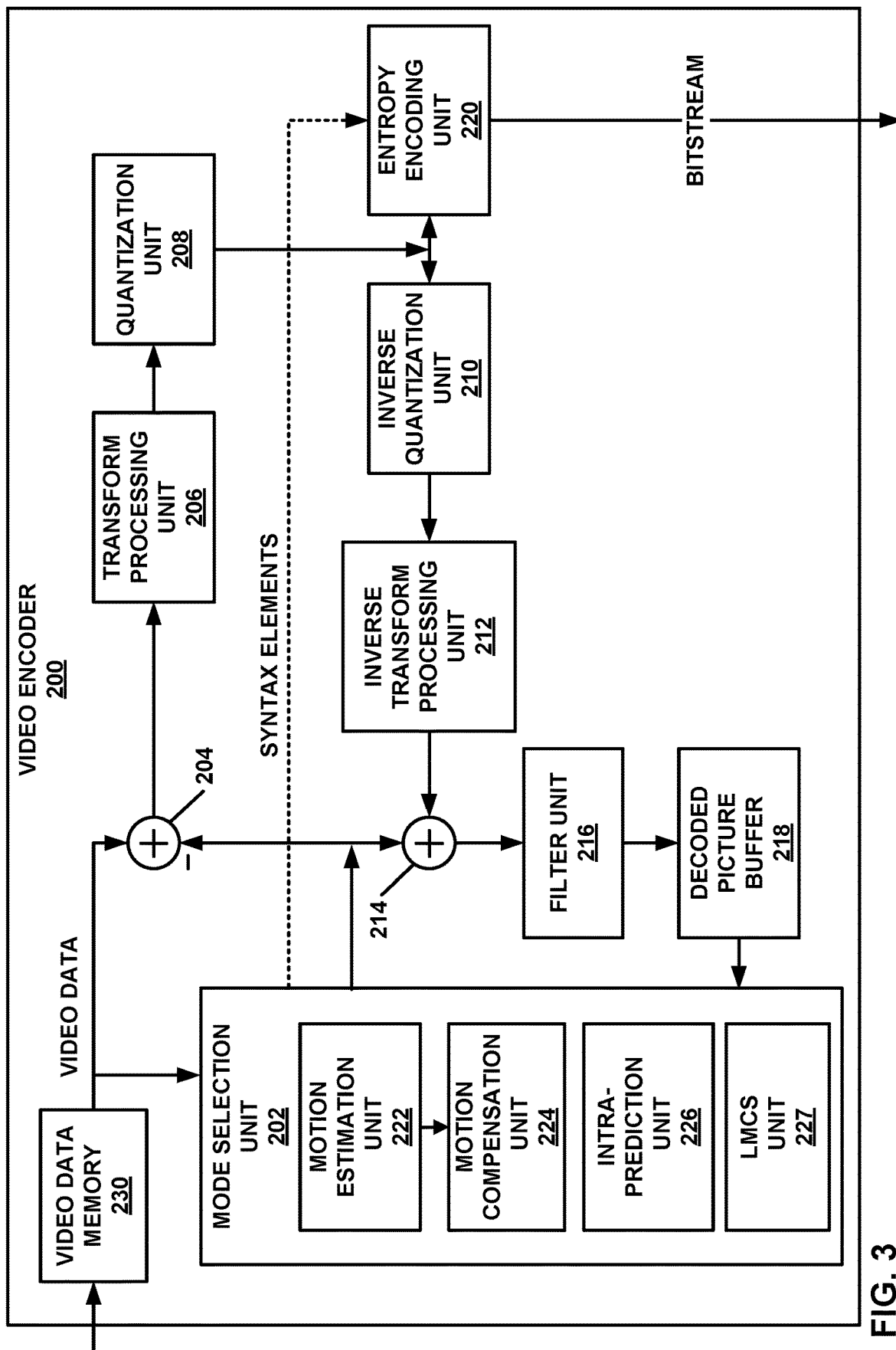
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, an intra-prediction unit 226, and luma mapping with chroma scaling (LMCS) unit 227. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

LMCS unit 227 may be configured to perform operations of the LMCS video coding tool. For example, LMCS unit 227 may perform luma mapping on the luma block of a CU, and chroma scaling on the chroma blocks of the CU. For luma mapping, LMCS unit 227 may map the luma samples of the luma block of the CU to generate mapped luma samples of a mapped luma block. LMCS unit 227 may also generate a mapped luma predication block for the prediction block generated by motion compensation unit 224 or intra-prediction unit 226.

Mode selection unit 202 provides the prediction block or mapped luma prediction block to residual generation unit 204. Residual generation unit 204 receives a raw, unencoded version of the current block from video data memory 230 or the mapped luma block and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

For LMCS, residual generation unit 204 may generate a mapped luma residual block based on a difference between the mapped luma block of the CU and the mapped prediction block. For the chroma components, residual generation unit 204 may generate a chroma residual block based on a difference between a chroma block and a chroma prediction block to generate a chroma residual block. LMCS unit 227 may perform scaling on the chroma residual block to generate a scaled chroma residual block.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform example techniques described in this disclosure.

For example, as described above, video encoder 200 may be configured to perform LMCS. Video encoder 200 may be configured to signal syntax elements that video decoder 300 utilizes to perform LMCS. For example, video encoder 200 may be configured to encode and signal syntax elements used to determine a scaling parameter that video decoder 300 is to use for chroma scaling. However, there may be instances where there are no chroma components for a CU, but LMCS is enabled for the CU. In such instances, unnecessary or erroneous signaling may occur, such as where video encoder 200 still signals syntax elements to determine scaling parameter for chroma scaling although there are no chroma components.

As one example, there may be no chroma components when ChromaArrayType is equal to zero. ChromaArrayType being equal to zero may mean that the color format is monochrome (e.g., black and white).

In accordance with one or more examples, video encoder 200 may determine that chroma related syntax elements are present for luma mapping with chroma scaling (LMCS) for a coding unit (CU). That is, video encoder 200 may determine that chroma components are preset for LMCS for a CU. In such examples, video encoder 200 may signal a flag (e.g., lmcs_cs_present_flag (also called aps_chroma_present_flag)) indicating that chroma related syntax elements are present (e.g., chroma components are present) based on the determination that chroma related syntax elements (e.g., chroma components) are present.

Video encoder 200 may encode a syntax element (e.g., lmcs_delta_abs_crs) when the chroma related syntax elements are present for LMCS for the CU. The syntax element may be indicative of a value for determining a scaling parameter for chroma scaling in LMCS. For example, the lmcs_delta_abs_crs may be indicative of the lmcsDeltaCrs value (e.g., lmcs_delta_abs_crs is the absolute value of lmcsDeltaCrs), and lmcsDeltaCrs may be for determining a scaling parameter (e.g., ChromaScaleCoeff) for chroma scaling in LMCS. Video encoder 200 may encode the syntax element in an LMCS syntax structure in an adaptation parameter set (APS).

Video encoder 200 may encode a chroma block of the CU based on the scaling parameter for chroma scaling. For example, video encoder 200 may determine a chroma prediction block, subtract the chroma prediction block from chroma block to generate a residual block, scale the residual block to generate a scaled residual block based on the scaling parameter, and signal information indicative of the scaled residual block.

In some examples, video encoder 200 may encode (e.g., signal) the syntax element (e.g., lmcs_delta_abs_crs) only when the chroma related syntax elements are present. For example, the above CU may be considered as a first CU. For a second CU, video encoder 200 may determine that chroma related syntax elements are not present for LMCS for a second CU. In this example, video encoder 200 may bypass encoding (e.g., including signaling) of the syntax element when the chroma related syntax elements are not present for LMCS for the second CU. That is, video encoder 200 may not signal lmcs_delta_abs_crs if there no chroma components.

There may also be certain constraints on video encoder 200. For example, video encoder 200 may determine a value for a second syntax element (e.g., lmcs_delta_cwprec_minus1), which is signaled in an adaptation parameter set (APS) for the CU, for specifying a number of bits used for representation of a third syntax element (e.g., lmcs_delta_abs_cw[i]) for LMCS. The value for the second syntax element may be constrained to a range of 0 to a value based on a bit depth (e.g., range of 0 to BitDepth−2).

As another example, video encoder 200 may determine that a sequence parameter set (SPS) indicates that cross component adaptive loop filter (CCALF) is disabled. In such examples, video encoder 200 may be constrained (e.g., configured to operate according to a constraint) to set at least one flag in an adaptation parameter set (APS) specifying that cross-component filters for a chroma component are not signaled when the SPS indicates that CCALF is disabled.

In some examples, video encoder 200 may be configured to determine that adaptive loop filtering (ALF) is disabled for one or more blocks, avoid setting an adaptation parameter set (APS) type equal to an APS type corresponding to ALF based on the ALF being disabled for the one or more blocks, and signal information indicating that ALF is disabled for one or more blocks.

In some examples, video encoder 200 may be configured to determine that cross component adaptive loop filter (CCALF) for one or more blocks is disabled, avoid signaling of information indicative of CCALF for one or more blocks based on CCALF being disabled for the one or more blocks, and signal information indicative of CCALF being disabled for the one or more blocks.

In some examples, video encoder 200 may be configured to determine whether to signal a syntax element indicative of whether chroma filters are signaled based on a chroma array type for a block.

In some examples, video encoder 200 may be configured to determine whether to signal information indicative of luma mapping and chroma scaling (LMCS) based on chroma array type, and signal information indicative of LMCS based on the determination.

In some examples, video encoder 200 may be configured to signal one or more syntax elements that indicate whether luma mapping and chroma scaling (LMCS) information is present in a syntax structure and signal LMCS information based on the one or more syntax elements.

Figure 4:
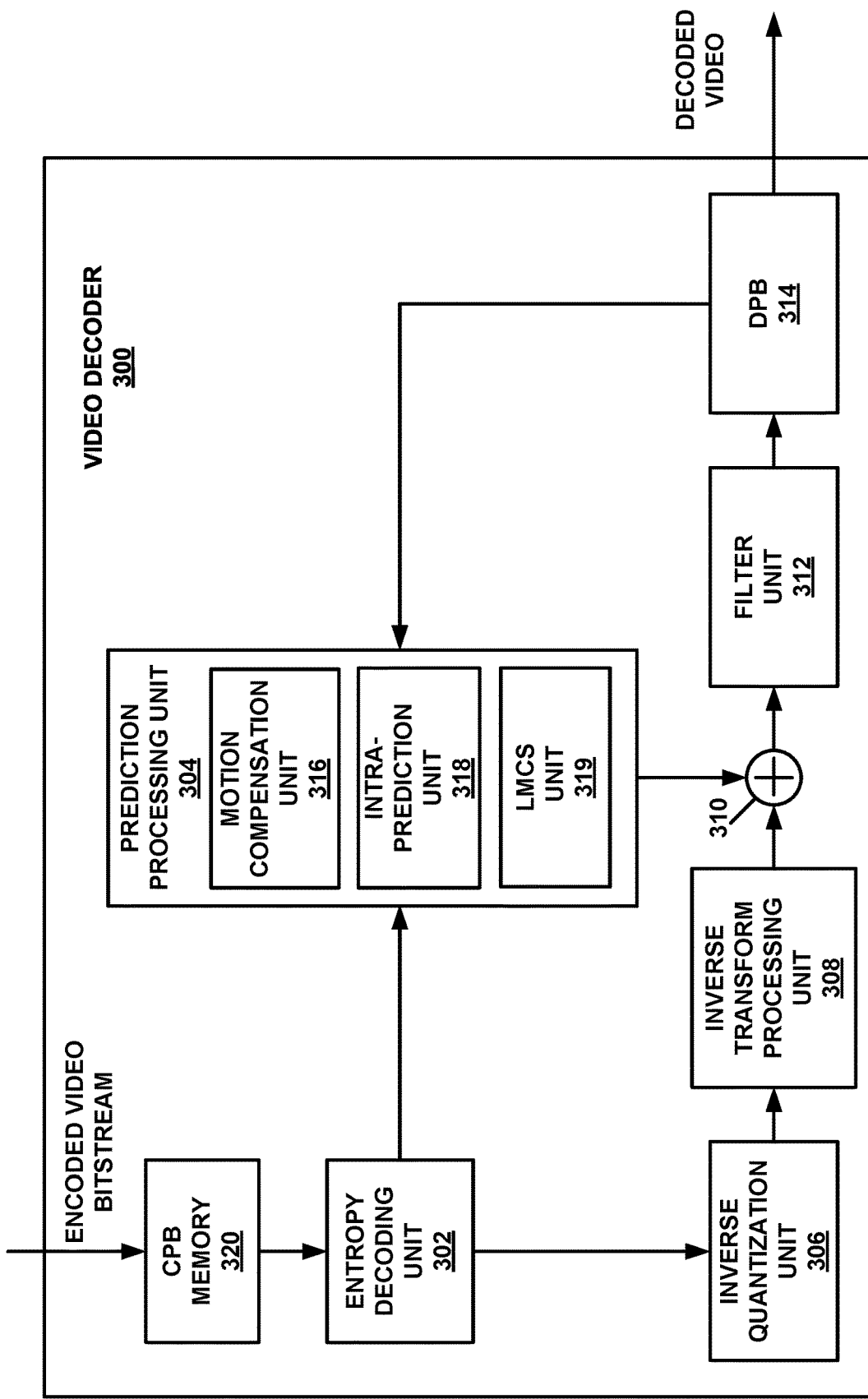
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316, intra-prediction unit 318, and luma mapping with chroma scaling (LMCS) unit 319. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

LMCS unit 319 may be configured to perform operations of the LMCS video coding tool. For example, LMCS unit 319 may receive mapped luma residual block. LMCS unit 319 may also generate a mapped prediction block. For instance, LMCS unit 319 may perform the mapping operations on a prediction block generated by motion compensation unit 316 or intra-prediction unit 318 to generate the mapped prediction block. Reconstruction unit 310 may add the mapped prediction block to the mapped luma residual block to generate a mapped luma block. LMCS unit 319 may perform the inverse mapping to generate the luma block.

For chroma, LMCS unit 319 may receive the scaled residual block (e.g., from inverse transform processing unit 308). LMCS unit 319 may scale (e.g., inverse scale) the scaled residual block with a scaling parameter to generate the chroma residual block. Reconstruction unit 310 may add the chroma residual block to a chroma prediction block to reconstruct the chroma block.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314.

As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform example techniques described in this disclosure.

As described above, video decoder 300 may be configured to perform LMCS. Video decoder 300 may be configured to parse syntax elements that video encoder 200 signaled to perform LMCS. For example, video decoder 300 may be configured to parse and decode syntax elements used to determine a scaling parameter that video decoder 300 is to use for chroma scaling. However, there may be instances where there are no chroma components for a CU, but LMCS is enabled for the CU. In such instances, unnecessary or erroneous signaling may occur, such as where video encoder 200 still signals syntax elements and video decoder 300 still parses syntax elements to determine scaling parameter for chroma scaling although there are no chroma components.

As described above, there may be no chroma components when ChromaArrayType is equal to zero. ChromaArrayType being equal to zero may mean that the color format is monochrome (e.g., black and white).

In accordance with one or more examples, video decoder 300 may determine that chroma related syntax elements (e.g., chroma components) are present for luma mapping with chroma scaling (LMCS) for a coding unit (CU). For example, video decoder 300 may parse a flag (e.g., lmcs_cs_present_flag (also called aps_chroma_present_flag)) indicating that chroma related syntax elements are present (e.g., chroma components are present). Video decoder 300 may determine that the chroma related syntax elements (e.g., chroma components) are present based on the flag.

Video decoder 300 may decode a syntax element (e.g., lmcs_delta_abs_crs) when the chroma related syntax elements are present for LMCS for the CU. The syntax element may be indicative of a value for determining a scaling parameter for chroma scaling in LMCS. For example, the lmcs_delta_abs_crs may be indicative of the lmcsDeltaCrs value (e.g., lmcs_delta_abs_crs is the absolute value of lmcsDeltaCrs), and lmcsDeltaCrs may be for determining a scaling parameter (e.g., ChromaScaleCoeff) for chroma scaling in LMCS. Video decoder 300 may decode the syntax element in an LMCS syntax structure in an adaptation parameter set (APS).

Video decoder 300 may decode a chroma block of the CU based on the scaling parameter for chroma scaling. For example, video decoder 300 may inverse scale a scaled residual chroma block based on the scaling parameter to generate a residual chroma block, determine a chroma prediction block, and add the residual chroma block to the chroma prediction block to reconstruct the chroma block.

In some examples, video decoder 300 may decode (e.g., parse) the syntax element (e.g., lmcs_delta_abs_crs) based on the determination that chroma related syntax elements are present. For example, the above CU may be considered as a first CU. For a second CU, video decoder 300 may determine that chroma related syntax elements are not present for LMCS for a second CU. In this example, video decoder 300 may bypass decoding (e.g., including parsing) of the syntax element when the chroma related syntax elements are not present for LMCS for the second CU. That is, video decoder 300 may not parse lmcs_delta_abs_crs if there no chroma components.

In some examples, video decoder 300 may be configured to bypass parsing of information indicative of an adaptation parameter set (APS) type for adaptive loop filtering (ALF) for one or more blocks based on ALF being disabled for the one or more blocks and reconstruct the one or more blocks.

In some examples, video decoder 300 may be configured to bypass parsing of information indicative of cross component adaptive loop filter (CCALF) for one or more blocks based on CCALF being disabled for the one or more blocks and reconstruct the one or more blocks.

In some examples, video decoder 300 may be configured to determine whether to parse a syntax element indicative of whether chroma filters are signaled based on a chroma array type for a block and reconstruct the block.

In some examples, video decoder 300 may be configured to determine whether to parse information indicative of luma mapping and chroma scaling (LMCS) based on chroma array type and perform LMCS based on whether information indicative of LMCS is parsed.

In some examples, video decoder 300 may be configured to receive one or more syntax elements that indicate whether luma mapping and chroma scaling (LMCS) information is present in a syntax structure and parse LMCS information based on the one or more syntax elements.

Figure 5:
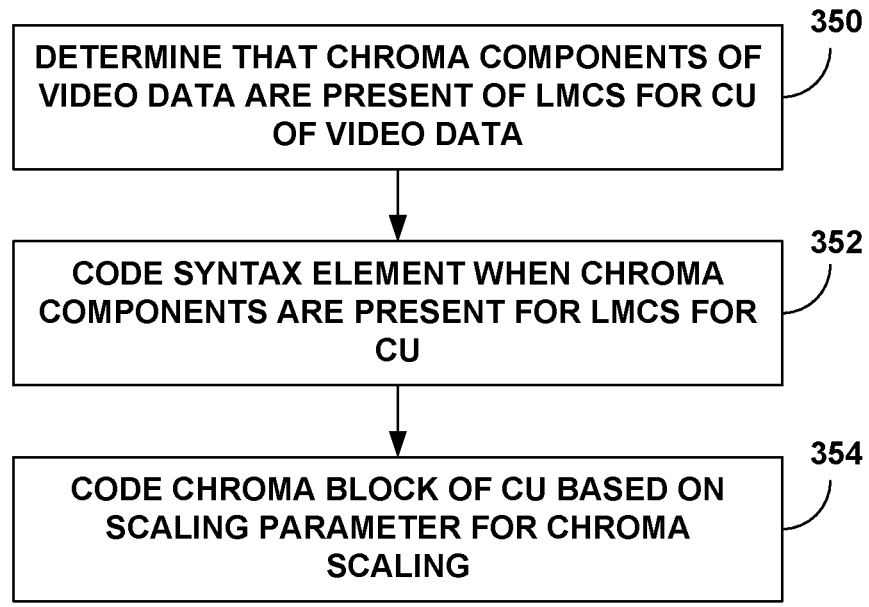
FIG. 5 is a flowchart illustrating an example method for coding video data.

FIG. 5 is a flowchart illustrating an example method for coding video data. The example of FIG. 5 is described with respect to a video coder (e.g., video encoder 200 or video decoder 300). The video coder may be part of processing circuitry (e.g., fixed-function or programmable). For example, memory may be configured store video data, and examples of the memory include memory 106, memory 120, video data memory 230, DPB 218, CPB memory 320, DPB 314, or some other memory. Processing circuitry (e.g., processing circuitry of a video coder) may be coupled to the memory and configured to perform the example techniques.

The video coder may determine that chroma related syntax elements of the video data are present for luma mapping with chroma scaling (LMCS) for a coding unit (CU) of the video data (350). For example, video encoder 200 may signal a flag (e.g., lmcs_cs_present_flag (also called aps_chroma_present_flag)) indicating that chroma related syntax elements are present based on the determination that chroma related syntax elements are present. Video decoder 300 may parse a flag (e.g., lmcs_cs_present_flag (also called aps_chroma_present_flag)) indicating that chroma related syntax elements are present. In this example, video decoder 300 may determine that the chroma related syntax elements are present based on the flag. As described above, chroma related syntax elements being present or not present may be indicative of chroma components being present or not present.

The video coder may code a syntax element of the video data when the chroma related syntax elements are present for LMCS for the CU (352). The syntax element is indicative of a value (e.g., lmcsDeltaCrs) for determining a scaling parameter (e.g., ChromaScaleCoeff) for chroma scaling in LMCS. For example, the syntax element specifies an absolute codeword value of the value (e.g., lmcsDeltaCrs) that is used for determining the scaling parameter (e.g., ChromaScaleCoeff) for chroma scaling. In some examples, the video coder may code the syntax element in an LMCS syntax structure in an adaptation parameter set (APS).

The video coder may code a chroma block of the video data of the CU based on the scaling parameter for chroma scaling (354). For example, video encoder 200 may determine a chroma prediction block, subtract the chroma prediction block from chroma block to generate a residual block, scale the residual block to generate a scaled residual block based on the scaling parameter, and signal information indicative of the scaled residual block. As another example, video decoder 300 may inverse scale a scaled residual chroma block based on the scaling parameter to generate a residual chroma block, determine a chroma prediction block, and add the residual chroma block to the chroma prediction block to reconstruct the chroma block.

In some examples, video encoder 200 may signal the syntax element (e.g., lmcs_delta_abs_crs) only when the chroma related syntax elements are present, and video decoder 300 may parse the syntax element (e.g., lmcs_delta_abs_crs) based on the determination that chroma related syntax elements are present. For instance, in the above example, the CU may be considered as a first CU.

Video encoder 200 may determine that chroma related syntax elements are not present for LMCS for a second CU, and in this example may signal the lmcs_cs_present_flag to indicate that there are no chroma components for the second CU. Video decoder 300 may parse the lmcs_cs_present_flag for the second CU, and determine that the there are no chroma components for the second CU.

Video encoder 200 may bypass encoding and video decoder 300 may bypass decoding of the syntax element (e.g., lmcs_delta_abs_crs) when the chroma related syntax elements are not present for LMCS for the second CU. For example, the above tables provide that:

if (lmcs_cs_present_flag) {
lmcs_delta_abs_crs.

In accordance with the above code, only if lmcs_cs_present_flag is true (i.e., there chroma components), that video encoder 200 signals and video decoder 300 parses the lmcs_delta_abs_crs syntax element. If, however, lmcs_cs_preseng_flag is false (i.e., there are no chroma components), then video encoder 200 bypass signaling (e.g., does not signal), and video decoder 300 bypass parsing (e.g., does not parse) the lmcs_delta_abs_crs syntax element. Hence, only if there are chroma components does video encoder 200 signal and video decoder 300 parse the lmcs_delta_abs_crs syntax element.

The following describes example techniques in accordance with this disclosure. The example techniques may be utilized separately or in any combination.

Clause 1A. A method of decoding video data, the method comprising bypassing parsing of information indicative of an adaptation parameter set (APS) type for adaptive loop filtering (ALF) for one or more blocks based on ALF being disabled for the one or more blocks, and reconstructing the one or more blocks.

Clause 2A. The method of clause 1A, further comprising determining that ALF is disabled for the one or more blocks based on signaling received in a parameter set.

Clause 3A. A method of decoding video data, the method comprising bypassing parsing of information indicative of cross component adaptive loop filter (CCALF) for one or more blocks based on CCALF being disabled for the one or more blocks, and reconstructing the one or more blocks.

Clause 4A. The method of clause 3A, further comprising determining that CCALF is disabled for the one or more blocks based on signaling received in a parameter set.

Clause 5A. The method of any of clauses 3A and 4A, wherein bypassing parsing comprises bypassing parsing in an adaptive loop filter (ALF) adaptation parameter set (APS).

Clause 6A. The method of any of clauses 3A-5A, further comprising determining whether to parse syntax elements indicative of whether cross-component filters for chroma components are signaled based on at least one of a syntax element indicating whether CCALF is enabled or a syntax element indicative of chroma array type.

Clause 7A. A method of decoding, the method comprising determining whether to parse a syntax element indicative of whether chroma filters are signaled based on a chroma array type for a block, and reconstructing the block.

Clause 8A. A method of decoding video data, the method comprising determining whether to parse information indicative of luma mapping and chroma scaling (LMCS) based on chroma array type, and performing LMCS based on whether information indicative of LMCS is parsed.

Clause 9A. A method of decoding video data, the method comprising receiving one or more syntax elements that indicate whether luma mapping and chroma scaling (LMCS) information is present in a syntax structure, and parsing LMCS information based on the one or more syntax elements.

Clause 10A. A method of encoding video data, the method comprising determining that adaptive loop filtering (ALF) is disabled for one or more blocks, avoiding setting an adaptation parameter set (APS) type equal to an APS type corresponding to ALF based on the ALF being disabled for the one or more blocks, and signaling information indicating that ALF is disabled for one or more blocks.

Clause 11A. A method of encoding video data, the method comprising determining that cross component adaptive loop filter (CCALF) for one or more blocks is disabled, avoiding signaling of information indicative of CCALF for one or more blocks based on CCALF being disabled for the one or more blocks, and signaling information indicative of CCALF being disabled for the one or more blocks.

Clause 12A. The method of clause 11A, wherein avoiding signaling comprises avoiding signaling in an adaptive loop filter (ALF) adaptation parameter set (APS).

Clause 13A. A method of encoding, the method comprising determining whether to signal a syntax element indicative of whether chroma filters are signaled based on a chroma array type for a block.

Clause 14A. A method of encoding video data, the method comprising determining whether to signal information indicative of luma mapping and chroma scaling (LMCS) based on chroma array type, and signaling information indicative of LMCS based on the determination.

Clause 15A. A method of encoding video data, the method comprising signaling one or more syntax elements that indicate whether luma mapping and chroma scaling (LMCS) information is present in a syntax structure, and signaling LMCS information based on the one or more syntax elements.

Clause 16A. A method of decoding video data, the method comprising any one or any combination of clauses 1A-9A.

Clause 17A. A method of encoding video data, the method comprising any one or any combination of clauses 10A-15A.

Clause 18A. A device for decoding video data, the device comprising memory configured to store video data, and processing circuitry configured to perform the method of clause 16A.

Clause 19A. A device for encoding video data, the device comprising memory configured to store video data, and processing circuitry configured to perform the method of clause 17A.

Clause 20A. The device of any of clauses 18A and 19A, further comprising a display configured to display decoded video data.

Clause 21A. The device of any of clauses 18A-20A, wherein the device comprises one or more of a camera, a computer, a mobile device, a broadcast receiver device, or a set-top box.

Clause 22A. The device of any of clauses 18A-21A, wherein the device comprises a video decoder.

Clause 23A. The device of any of clauses 18A-22A, wherein the device comprises a video encoder.

Clause 24A. A computer-readable storage medium having stored thereon instructions that, when executed, cause one or more processors to perform the method of any of clauses 16A or 17A.

Clause 25A. A device for coding video data, the device comprising means for performing the method of any of clauses 16A or 17A.

Clause 1B. A method of coding video data, the method comprising determining that chroma related syntax elements of the video data are present for luma mapping with chroma scaling (LMCS) for a coding unit (CU) of the video data, coding a syntax element of the video data when the chroma related syntax elements are present for LMCS for the CU, the syntax element is indicative of a value for determining a scaling parameter for chroma scaling in LMCS, and coding a chroma block of the CU based on the scaling parameter for chroma scaling.

Clause 2B. The method of clause 1B, further comprising parsing a flag indicating that chroma related syntax elements are present, wherein determining that the chroma related syntax elements are present comprises determining that the chroma related syntax elements are present based on the flag.

Clause 3B. The method of any of clauses 1B and 2B, further comprising signaling a flag indicating that chroma related syntax elements are present based on the determination that chroma related syntax elements are present.

Clause 4B. The method of any of clauses 1B-3B, wherein coding the syntax element comprises parsing the syntax element based on the determination that chroma related syntax elements are present.

Clause 5B. The method of any of clauses 1B-4B, wherein coding the syntax element comprises signaling the syntax element only when the chroma related syntax elements are present.

Clause 6B. The method of any of clauses 1B-5B, wherein coding the syntax element comprises coding the syntax element in an LMCS syntax structure in an adaptation parameter set (APS).

Clause 7B. The method of any of clauses 1B-6B, wherein the syntax element specifies an absolute codeword value of the value that is used for determining the scaling parameter for chroma scaling.

Clause 8B. The method of any of clauses 1B-7B, wherein the syntax element comprises a first syntax element, and wherein the method of coding comprises a method of encoding, the method further comprising determining a value for a second syntax element, which is signaled in an adaptation parameter set (APS) for the CU, for specifying a number of bits used for representation of a third syntax element for LMCS, wherein the value for the second syntax element is constraint to a range of 0 to a value based on a bit depth.

Clause 9B. The method of any of clauses 1B-8B, wherein the method of coding comprises a method of encoding, the method further comprising determining that a sequence parameter set (SPS) indicates that cross component adaptive loop filter (CCALF) is disabled, and setting at least one flag in an adaptation parameter set (APS) specifying that cross-component filters for a chroma component are not signaled when the SPS indicates that CCALF is disabled.

Clause 10B. The method of any of clauses 1B-9B, wherein the CU is a first CU, the method further comprising determining that chroma related syntax elements are not present for LMCS for a second CU, bypassing coding of the syntax element when the chroma related syntax elements are not present for LMCS for the second CU.

Clause 11B. The method of clauses 1B-10B, wherein coding the chroma block of the CU based on the scaling parameter for chroma scaling comprises decoding the chroma block, and wherein decoding the chroma block comprises inverse scaling a scaled residual chroma block based on the scaling parameter to generate a residual chroma block, determining a chroma prediction block, and adding the residual chroma block to the chroma prediction block to reconstruct the chroma block.

Clause 12B. The method of any of clauses 1B-11B, wherein coding the chroma block based on the scaling parameter for chroma scaling comprises encoding the chroma block, and wherein encoding the chroma block comprises determining a chroma prediction block, subtracting the chroma prediction block from chroma block to generate a residual block, scaling the residual block to generate a scaled residual block based on the scaling parameter, and signaling information indicative of the scaled residual block.

Clause 13B. A device for coding video data, the device comprising memory configured to store the video data and processing circuitry configured to determine that chroma related syntax elements of the video data are present for luma mapping with chroma scaling (LMCS) for a coding unit (CU) of the video data, code a syntax element of the video data when the chroma related syntax elements are present for LMCS for the CU, the syntax element is indicative of a value for determining a scaling parameter for chroma scaling in LMCS, and code a chroma block of the CU based on the scaling parameter for chroma scaling.

Clause 14B. The device of clause 13B, wherein the processing circuitry is configured to parse a flag indicating that chroma related syntax elements are present, wherein to determine that the chroma related syntax elements are present, the processing circuitry is configured to determine that the chroma related syntax elements are present based on the flag.

Clause 15B. The device of any of clauses 13B and 14B, wherein the processing circuitry is configured to signal a flag indicating that chroma related syntax elements are present based on the determination that chroma related syntax elements are present.

Clause 16B. The device of any of clauses 13B-15B, wherein to code the syntax element, the processing circuitry is configured to parse the syntax element based on the determination that chroma related syntax elements are present.

Clause 17B. The device of any of clause 13B-16B, wherein to code the syntax element, the processing circuitry is configured to signaling the syntax element only when the chroma related syntax elements are present.

Clause 18B. The device of any of clauses 13B-17B, wherein to code the syntax element, the processing circuitry is configured to code the syntax element in an LMCS syntax structure in an adaptation parameter set (APS).

Clause 19B. The device of clauses 13B-18B, wherein the syntax element specifies an absolute codeword value of the value that is used for determining the scaling parameter for chroma scaling.

Clause 20B. The device of any of clauses 13B-19B, wherein the syntax element comprises a first syntax element, and wherein the processing circuitry is configured to determine a value for a second syntax element, which is signaled in an adaptation parameter set (APS) for the CU, for specifying a number of bits used for representation of a third syntax element for LMCS, wherein the value for the second syntax element is constraint to a range of 0 to a value based on a bit depth.

Clause 21B. The device of any of clauses 13B-20B, wherein the processing circuitry is configured to determine that a sequence parameter set (SPS) indicates that cross component adaptive loop filter (CCALF) is disabled, and set at least one flag in an adaptation parameter set (APS) specifying that cross-component filters for a chroma component are not signaled when the SPS indicates that CCALF is disabled.

Clause 22B. The device of any of clauses 13B-21B, wherein the CU is a first CU, and wherein the processing circuitry is configured to determine that chroma related syntax elements are not present for LMCS for a second CU, and bypass coding of the syntax element when the chroma related syntax elements are not present for LMCS for the second CU.

Clause 23B. The device of any of clauses 13B-22B, wherein to code the chroma block of the CU based on the scaling parameter for chroma scaling, the processing circuitry is configured to decode the chroma block, and wherein to decode the chroma block, the processing circuitry is configured to inverse scale a scaled residual chroma block based on the scaling parameter to generate a residual chroma block, determine a chroma prediction block, and add the residual chroma block to the chroma prediction block to reconstruct the chroma block.

Clause 24B. The device of any of clauses 13B-23B, wherein to code the chroma block based on the scaling parameter for chroma scaling, the processing circuitry is configured to encode the chroma block, and wherein to encode the chroma block, the processing circuitry is configured to determine a chroma prediction block, subtract the chroma prediction block from chroma block to generate a residual block, scale the residual block to generate a scaled residual block based on the scaling parameter, and signal information indicative of the scaled residual block.

Clause 25B. The device of any of clauses 13B-24B, wherein the device comprises one or more of a camera, a computer, a mobile device, a broadcast receiver device, or a set-top box.

Clause 26B. A computer-readable storage medium storing instructions thereon that when executed cause one or more processors to determine that chroma related syntax elements of the video data are present for luma mapping with chroma scaling (LMCS) for a coding unit (CU) of the video data, code a syntax element of the video data when the chroma related syntax elements are present for LMCS for the CU, the syntax element is indicative of a value for determining a scaling parameter for chroma scaling in LMCS, and code a chroma block of the CU based on the scaling parameter for chroma scaling.

Clause 27B. The computer-readable storage medium of clause 26B, further comprising instructions that cause the one or more processors to at least one of parse a flag indicating that chroma related syntax elements are present, wherein the instructions that cause the one or more processors to determine that the chroma related syntax elements are present comprise instructions that cause the one or more processors to determine that the chroma related syntax elements are present based on the flag, or signal a flag indicating that chroma related syntax elements are present based on the determination that chroma related syntax elements are present.

Clause 28B. The computer-readable storage medium of any of clauses 26B and 27B, wherein the instructions that cause the one or more processors to code the syntax element comprise instructions that cause the one or more processors to at least one of parse the syntax element based on the determination that chroma related syntax elements are present, or signal the syntax element only when the chroma related syntax elements are present.

Clause 29B. The computer-readable storage medium of any of clauses 26B-28B, wherein the instructions that cause the one or more processors to code the syntax element comprise instructions that cause the one or more processors to code the syntax element in an LMCS syntax structure in an adaptation parameter set (APS), and wherein the syntax element specifies an absolute codeword value of the value that is used for determining the scaling parameter for chroma scaling.

Clause 30B. A device for coding video data, the device comprising means for determining that chroma related syntax elements of the video data are present for luma mapping with chroma scaling (LMCS) for a coding unit (CU) of the video data, means for coding a syntax element of the video data when the chroma related syntax elements are present for LMCS for the CU, the syntax element is indicative of a value for determining a scaling parameter for chroma scaling in LMCS, and means for coding a chroma block of the CU based on the scaling parameter for chroma scaling.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:
1. A method of coding video data, the method comprising:
determining that chroma related syntax elements of the video data are present for luma mapping with chroma scaling (LMCS) for a first coding unit (CU) of the video data;
coding a first syntax element of the video data when the chroma related syntax elements are present for LMCS for the first CU, the first syntax element is indicative of a first value for determining a scaling parameter for chroma scaling in LMCS;

coding a chroma block of the first CU based on the scaling parameter for chroma scaling;

coding a second syntax element in a picture header for a picture that includes a second CU having a luma block, the second syntax element being an identification of an adaptation parameter set (APS);

coding a third value for a third syntax element for the luma block, the third syntax element specifying a number of bits used for representation of a fourth syntax element for LMCS, wherein the second syntax element is in the picture header and the third value of the third syntax element is within a range of 0 to a bit depth —2; and coding the luma block using LMCS.

2. The method of claim 1, further comprising:

parsing a flag indicating that the chroma related syntax elements are present, wherein determining that the chroma related syntax elements are present comprises determining that the chroma related syntax elements are present based on the flag.

3. The method of claim 1, further comprising:

signaling a flag indicating that the chroma related syntax elements are present based on the determination that the chroma related syntax elements are present.

4. The method of claim 1, wherein coding the first syntax element comprises parsing the first syntax element based on the determination that the chroma related syntax elements are present.

5. The method of claim 1, wherein coding the first syntax element comprises signaling the first syntax element only when the chroma related syntax elements are present.

6. The method of claim 1, wherein coding the first syntax element comprises coding the first syntax element in an LMCS syntax structure in the APS.

7. The method of claim 1, wherein the first syntax element specifies an absolute codeword value of the first value that is used for determining the scaling parameter for chroma scaling.

8. The method of claim 1, further comprising:

coding at least one flag in the APS specifying that cross-component filters for a chroma component are not signaled when a sequence parameter set (SPS) indicates that cross component adaptive loop filter (CCALF) is disabled.

9. The method of claim 1, further comprising:

determining that the chroma related syntax elements are not present for LMCS for a third CU; and bypassing coding of the first syntax element when the chroma related syntax elements are not present for LMCS for the third CU.

10. The method of claim 1, wherein coding the chroma block of the first CU based on the scaling parameter for chroma scaling comprises decoding the chroma block, and wherein decoding the chroma block comprises:

inverse scaling a scaled residual chroma block based on the scaling parameter to generate a residual chroma block;

determining a chroma prediction block; and adding the residual chroma block to the chroma prediction block to reconstruct the chroma block.

11. The method of claim 1, wherein coding the chroma block based on the scaling parameter for chroma scaling comprises encoding the chroma block, and wherein encoding the chroma block comprises:

determining a chroma prediction block;

subtracting the chroma prediction block from the chroma block to generate a residual block;

scaling the residual block to generate a scaled residual block based on the scaling parameter; and signaling information indicative of the scaled residual block.

12. A device for coding video data, the device comprising:

memory configured to store the video data; and processing circuitry configured to:

determine that chroma related syntax elements of the video data are present for luma mapping with chroma scaling (LMCS) for a first coding unit (CU) of the video data;

code a first syntax element of the video data when the chroma related syntax elements are present for LMCS for the first CU, the first syntax element is indicative of a first value for determining a scaling parameter for chroma scaling in LMCS;

code a chroma block of the first CU based on the scaling parameter for chroma scaling;

code a second syntax element in a picture header for a picture that includes a second CU having a luma block, the second syntax element being an identification of an adaptation parameter set (APS);

code a third value for a third syntax element for the luma block, the third syntax element specifying a number of bits used for representation of a fourth syntax element for LMCS, wherein the second syntax element is in the picture header and the third value of the third syntax element is within a range of 0 to a bit depth —2; and code the luma block using LMCS.

13. The device of claim 12, wherein the processing circuitry is configured to parse a flag indicating that the chroma related syntax elements are present, wherein to determine that the chroma related syntax elements are present, the processing circuitry is configured to determine that the chroma related syntax elements are present based on the flag.

14. The device of claim 12, wherein the processing circuitry is configured to:

signal a flag indicating that the chroma related syntax elements are present based on the determination that the chroma related syntax elements are present.

15. The device of claim 12, wherein to code the first syntax element, the processing circuitry is configured to parse the first syntax element based on the determination that the chroma related syntax elements are present.

16. The device of claim 12, wherein to code the first syntax element, the processing circuitry is configured to signal the first syntax element only when the chroma related syntax elements are present.

17. The device of claim 12, wherein to code the first syntax element, the processing circuitry is configured to code the first syntax element in an LMCS syntax structure in the APS.

18. The device of claim 12, wherein the first syntax element specifies an absolute codeword value of the first value that is used for determining the scaling parameter for chroma scaling.

19. The device of claim 12, wherein the processing circuitry is configured to:
  code at least one flag in the APS specifying that cross-component filters for a chroma component are not signaled when a sequence parameter set (SPS) indicates that cross component adaptive loop filter (CCALF) is disabled.

20. The device of claim 12, wherein the processing circuitry is configured to:
  determine that the chroma related syntax elements are not present for LMCS for a third CU; and
  bypass coding of the first syntax element when the chroma related syntax elements are not present for LMCS for the third CU.

21. The device of claim 12, wherein to code the chroma block of the first CU based on the scaling parameter for chroma scaling, the processing circuitry is configured to decode the chroma block, and wherein to decode the chroma block, the processing circuitry is configured to:
  inverse scale a scaled residual chroma block based on the scaling parameter to generate a residual chroma block;
  determine a chroma prediction block; and
  add the residual chroma block to the chroma prediction block to reconstruct the chroma block.

22. The device of claim 12, wherein to code the chroma block based on the scaling parameter for chroma scaling, the processing circuitry is configured to encode the chroma block, and wherein to encode the chroma block, the processing circuitry is configured to:
  determine a chroma prediction block;
  subtract the chroma prediction block from the chroma block to generate a residual block;
  scale the residual block to generate a scaled residual block based on the scaling parameter; and
  signal information indicative of the scaled residual block.

23. The device of claim 12, wherein the device comprises one or more of a camera, a computer, a mobile device, a broadcast receiver device, or a set-top box.

24. A non-transitory computer-readable storage medium storing instructions thereon that when executed cause one or more processors to:
  determine that chroma related syntax elements of the video data are present for luma mapping with chroma scaling (LMCS) for a first coding unit (CU) of the video data;
  code a first syntax element of the video data when the chroma related syntax elements are present for LMCS for the first CU, the first syntax element is indicative of a first value for determining a scaling parameter for chroma scaling in LMCS;
  code a chroma block of the first CU based on the scaling parameter for chroma scaling;
  code a second syntax element in a picture header for a picture that includes a second CU having a luma block, the second syntax element being an identification of an adaptation parameter set (APS);
  code a third value for a third syntax element for the luma block, the third syntax element specifying a number of bits used for representation of a fourth syntax element for LMCS, wherein the second syntax element is in the picture header and the third value of the third syntax element is within a range of 0 to a bit depth —2; and
  code the luma block using LMCS.

25. The non-transitory computer-readable storage medium of claim 24, further comprising instructions that cause the one or more processors to at least one of:
  parse a flag indicating that the chroma related syntax elements are present, wherein the instructions that cause the one or more processors to determine that the chroma related syntax elements are present comprise instructions that cause the one or more processors to determine that the chroma related syntax elements are present based on the flag, or
  signal a flag indicating that the chroma related syntax elements are present based on the determination that the chroma related syntax elements are present.

26. The non-transitory computer-readable storage medium of claim 24, wherein the instructions that cause the one or more processors to code the first syntax element comprise instructions that cause the one or more processors to at least one of:
  parse the first syntax element based on the determination that the chroma related syntax elements are present, or
  signal the first syntax element only when the chroma related syntax elements are present.

27. The non-transitory computer-readable storage medium of claim 24, wherein the instructions that cause the one or more processors to code the first syntax element comprise instructions that cause the one or more processors to code the first syntax element in an LMCS syntax structure in the APS, and wherein the first syntax element specifies an absolute codeword value of the first value that is used for determining the scaling parameter for chroma scaling.

28. A device for coding video data, the device comprising:
  means for determining that chroma related syntax elements of the video data are present for luma mapping with chroma scaling (LMCS) for a first coding unit (CU) of the video data;
  means for coding a first syntax element of the video data when the chroma related syntax elements are present for LMCS for the first CU, the first syntax element is indicative of a first value for determining a scaling parameter for chroma scaling in LMCS;
  means for coding a chroma block of the first CU based on the scaling parameter for chroma scaling;
  means for coding a second syntax element in a picture header for a picture that includes a second CU having a luma block, the second syntax element being an identification of an adaptation parameter set (APS);
  means for coding a third value for a third syntax element for the luma block, the third syntax element specifying a number of bits used for representation of a fourth syntax element for LMCS, wherein the second syntax element is in the picture header and the third value of the third syntax element is within a range of 0 to a bit depth —2; and
  means for coding the luma block using LMCS.

* * * * *